(12) United States Patent
May et al.

(10) Patent No.: US 12,453,716 B2
(45) Date of Patent: Oct. 28, 2025

(54) SMALL MOLECULE ANTAGONIST TO PACAP RECEPTOR AND USES THEREOF

(71) Applicant: University of Vermont and State Agricultural College, Burlington, VT (US)

(72) Inventors: Victor May, Essex, VT (US); Matthias Brewer, Williston, VT (US); Jianing Li, South Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 626 days.

(21) Appl. No.: 17/429,843

(22) PCT Filed: Feb. 13, 2020

(86) PCT No.: PCT/US2020/018098
§ 371 (c)(1),
(2) Date: Aug. 10, 2021

(87) PCT Pub. No.: WO2020/168068
PCT Pub. Date: Aug. 20, 2020

(65) Prior Publication Data
US 2022/0125762 A1    Apr. 28, 2022

Related U.S. Application Data

(60) Provisional application No. 62/804,874, filed on Feb. 13, 2019.

(51) Int. Cl.
| | |
|---|---|
| *A61K 31/4045* | (2006.01) |
| *A61K 31/166* | (2006.01) |
| *A61K 31/437* | (2006.01) |
| *C07C 251/80* | (2006.01) |
| *C07D 209/10* | (2006.01) |
| *C07D 471/04* | (2006.01) |

(52) U.S. Cl.
CPC ........ *A61K 31/4045* (2013.01); *A61K 31/166* (2013.01); *A61K 31/437* (2013.01); *C07C 251/80* (2013.01); *C07D 209/10* (2013.01); *C07D 471/04* (2013.01)

(58) Field of Classification Search
CPC .................................................. C07D 471/04
See application file for complete search history.

(56) References Cited

U.S. PATENT DOCUMENTS

| | | |
|---|---|---|
| 6,613,942 B1 | 9/2003 | Ling et al. |
| 7,125,880 B1 * | 10/2006 | Chen ............... C07D 239/02 |
| | | 514/354 |
| 2002/0016328 A1 | 2/2002 | Chen |
| 2006/0270880 A1 | 11/2006 | Beswick et al. |
| 2008/0064715 A1 | 3/2008 | Horiguchi et al. |
| 2009/0005379 A1 | 1/2009 | Nettekoven et al. |
| 2018/0360782 A1 | 12/2018 | Dealwis |

FOREIGN PATENT DOCUMENTS

| | | | |
|---|---|---|---|
| WO | WO 00/39088 A1 | 7/2000 | |
| WO | WO-2007025613 A2 * | 3/2007 | ............. A61K 31/00 |
| WO | WO-2012106407 A2 * | 8/2012 | ........... C12Q 1/6883 |

OTHER PUBLICATIONS

Parker, S. G., et al. Naunyn-Schmiedeberg's Arch Pharmacol (1995) 353:28-35. (Year: 1995).*
Chen, H. et al. QSAR Comb. Sci. 2004, 23. (Year: 2004).*
Hashimoto, H., et al. Ann. N.Y. Acad. Sci. 1070: 75-89 (2006). (Year: 2006).*
Lee, M., et al. Pain Physician. 2011; 14:145-161. (Year: 2011).*
Xiong, Y., et al. J. Med. Chem. 2012, 55, 6137-6148. (Year: 2012).*
Lebois, L. A. M., et al. Polypeptide—PACAP, Current Topics in Neurotoxicity. Chapter 45, 11. (Year: 2016).*
Healy, A. M., et al. Advanced Drug Delivery Reviews. 117 (2017) 25-46. (Year: 2017).*
Rautio, J., et al. Nature Reviews. Drug Discovery. vol. 17, pp. 559-587. (Year: 2018).*
Nonaka, N., et al. Peptides. 130, 2020, 170332. (Year: 2020).*
Cleveland Clinic. Eating Disorders. 2024. Web. pp. 1-11. (Year: 2024).*
International Search Report and Written Opinion mailed Jun. 9, 2020 for International Application No. PCT/US2020/018098.
International Preliminary Report on Patentability mailed Aug. 26, 2021 for International Application No. PCT/US2020/018098.
[No Author Listed], 3-Chloro-4-hydroxy-benzoic acid [1-(4-isopropyl-benzyl)-1H-indol-4-ylmethylene]-hydrazide. PubChem CID 9824797. Oct. 25, 2006. Retrieved from https://pubchem.ncbi.nlm.nih.gov/compound/9824797 on Mar. 28, 2020. 11 pages.
[No Author Listed], 3-Chloro-4-hydroxy-benzoic acid [1-(3,4-dichloro-benzyl)-1H-indol-4-ylmethylene]-hydrazide. PubChem CID No. 9869430. Oct. 25, 2006. Retrieved from https://pubchem.ncbi.nlm.nih.gov/compound/9869430 on Mar. 28, 2020. 21 pages.

(Continued)

*Primary Examiner* — Eric Olson
*Assistant Examiner* — Samuel L Galster
(74) *Attorney, Agent, or Firm* — Schwegman Lundberg & Woessner, P.A.

(57) ABSTRACT

The invention relates to compounds that demonstrate efficacy in blocking PACAP receptors (e.g. PAC1) and associated methods of treating neurological diseases or disorders using the disclosed compounds. The neurological diseases or disorders include, but are not limited to, stress-related diseases (e.g. chronic stress, post-traumatic stress disorder (PTSD), anxiety, or general anxiety disorder), pain-related diseases (e.g. chronic pain, primary headache disorders, or migraines), or addiction (e.g. addiction to a substance (e.g. addiction to cocaine, amphetamines, methamphetamine, methylphenidate, nicotine, alcohol, prescription medication, marijuana, tobacco, or an opioid selected from heroin, fentanyl, codeine, hydrocodone, morphine, oxycodone, hydromorphone, and methadone)).

14 Claims, 13 Drawing Sheets

(56) References Cited

OTHER PUBLICATIONS

[No Author Listed], 3-Chloro-4-hydroxy-benzoic acid [1-(4-trifluoromethyl-benzyl)-1H-indol-4-ylmethylene]-hydrazide. PubChem CID No. 9956429. Oct. 25, 2006. Retrieved from https://pubchem.ncbi.nlm.nih.gov/compound/9956429 on Mar. 28, 2020. 11 pages.

[No Author Listed], 4-(1-Ethyl-propylamino)-6-methyl-2-(2,4,6-trimethyl-phenoxy)nicotinic acid methyl ester. PubChem CID No. 23216576. Dec. 5, 2007. Retrieved from https://pubchem.ncbi.nlm.nih.gov/compound/23216576 on Mar. 29, 2020. 10 pages.

[No Author Listed], 4-(1-Ethyl-propylamino)-6-methyl-2-(2,4,6-trimethyl-phenoxy)nicotinic acid. PubChem CID No. 21843396. Dec. 5, 2007. Retrieved from https://pubchem.ncbi.nlm.nih.gov/compound/21843396 on Mar. 29, 2020. 10 pages.

Beebe et al., Discovery and SAR of hydrazide antagonists of the pituitary adenylate cyclase-activating polypeptide (PACAP) receptor type 1 (PAC1-R). Bioorg Med Chem Lett. Mar. 15, 2008;18(6):2162-6. doi: 10.1016/j.bmcl.2008.01.052. Epub Jan. 18, 2008.

Guo et al., Circulating monocytes accelerate acute liver failure by IL-6 secretion in monkey. J Cell Mol Med. Sep. 2018;22(9):4056-4067. doi: 10.1111/jcmm.13673. Epub Jul. 11, 2018. Erratum in: J Cell Mol Med. Dec. 2021;25(23):11035-11036.

Jazayeri et al., Extra-helical binding site of a glucagon receptor antagonist. Nature. May 12, 2016;533(7602):274-7. doi: 10.1038/nature17414. Epub Apr. 25, 2016.

King et al., The Effects of Prior Stress on Anxiety-Like Responding to Intra-BNST Pituitary Adenylate Cyclase Activating Polypeptide in Male and Female Rats. Neuropsychopharmacology. Jul. 2017;42(8):1679-1687. doi: 10.1038/npp.2017.16. Epub Jan. 20, 2017.

Lezak et al., Pituitary adenylate cyclase-activating polypeptide (PACAP) in the bed nucleus of the stria terminalis (BNST) increases corticosterone in male and female rats. Psychoneuroendocrinology. Jul. 2014;45:11-20. doi: 10.1016/j.psyneuen.2014.03.007. Epub Mar. 25, 2014.

Liao et al., Conformational Transitions of the Pituitary Adenylate Cyclase-Activating Polypeptide Receptor, a Human Class B GPCR. Sci Rep. Jul. 14, 2017;7(1):5427. doi: 10.1038/s41598-017-05815-x.

Liao et al., PAC1 Receptors: Shapeshifters in Motion. J Mol Neurosci. Jul. 2019;68(3):331-339. doi: 10.1007/s12031-018-1132-0. Epub Aug. 3, 2018.

Ling et al., Identification of alkylidene hydrazides as glucagon receptor antagonists. J Med Chem. Sep. 13, 2001;44(19):3141-9. doi: 10.1021/jm000547o.

Madsen et al., Optimization of alkylidene hydrazide based human glucagon receptor antagonists. Discovery of the highly potent and orally available 3-cyano-4-hydroxybenzoic acid [1-(2,3,5,6-tetramethylbenzyl)-1H-indol-4-ylmethylene]hydrazide. J Med Chem. Dec. 19, 2002;45(26):5755-75. doi: 10.1021/jm0208572.

Miles et al., Pituitary Adenylate Cyclase-Activating Peptide in the Bed Nucleus of the Stria Terminalis Mediates Stress-Induced Reinstatement of Cocaine Seeking in Rats. Neuropsychopharmacology. Apr. 2018;43(5):978-986. doi: 10.1038/npp.2017.135. Epub Jun. 28, 2017.

Moro et al., Functional characterization of structural alterations in the sequence of the vasodilatory peptide maxadilan yields a pituitary adenylate cyclase-activating peptide type 1 receptor-specific antagonist. J Biol Chem. Aug. 13, 1999;274(33):23103-10. doi: 10.1074/jbc.274.33.23103.

Moro et al., Maxadilan, the vasodilator from sand flies, is a specific pituitary adenylate cyclase activating peptide type I receptor agonist. J Biol Chem. Jan. 10, 1997;272(2):966-70. doi: 10.1074/jbc.272.2.966.

Stroth et al., Stress hormone synthesis in mouse hypothalamus and adrenal gland triggered by restraint is dependent on pituitary adenylate cyclase-activating polypeptide signaling. Neuroscience. Feb. 17, 2010;165(4):1025-30. doi: 10.1016/j.neuroscience.2009.11.023. Epub Nov. 18, 2009.

* cited by examiner

SMALL MOLECULE ANTAGONIST TO PACAP RECEPTOR AND USES THEREOF

RELATED APPLICATIONS

The present application is a National stage filing under 35 U.S.C. 371 of International Patent Application Serial No. PCT/US2020/018098, filed Feb. 13, 2020, which claims priority under 35 U.S.C. § 119(e) to U.S. provisional application, U.S.S.N. 62/804,874, filed Feb. 13, 2019, which is incorporated herein by reference.

BACKGROUND OF THE INVENTION

Pituitary adenylate cyclase activating polypeptide (PACAP) is a widely expressed peptide in central and peripheral neurons, and behaves as a neurotransmitter and neurotrophic regulator with critical roles in signaling, physiological homeostasis, development, survival, proliferation, differentiation and regeneration (Vaudry et al., 2009). PACAP belongs to the vasoactive intestinal peptide (VIP)/secretin/glucagon family of related peptides. It is endoproteolytically cleaved from a 176 amino acid precursor molecule into two alternatively processed α-amidated bioactive PACAP38 or PACAP27 peptides, but PACAP38 is typically more than 100-fold more abundant than PACAP27 in nervous tissues (Miyata et al., 1989, 1990; Arimura et al., 1991). PACAP can be found in tunicates and the PACAP amino acid sequence is identical in all mammals examined to date (Sherwood et al., 2000), demonstrating that it is well conserved in evolution.

Because PACAP shares nearly 70% amino acid homology with VIP, the PACAP/VIP peptides share three receptor subtypes (Harmar et al., 2012; Blechman and Levkowitz, 2013). The PACAP/VIP receptors belong to Class B of the 7-transmembrane G protein-coupled receptors. PACAP binding is specific at the PAC1 receptor (ADCYAP1R1); PACAP and VIP bind with near equal high affinities to VPAC1 (VIPR1) and VPAC2 (VIPR2) receptors. There are several alternatively spliced forms of the PAC1 receptor based on the absence or presence of two 84-base pair cassettes, termed hip and hop, inserted into the receptor DNA corresponding to the third intracellular cytoplasmic loop (Spengler et al., 1993). Hence the PAC1 receptor isoforms may be null (neither hip nor hop cassette inserts), hip, hop (there is a shortened form of hop called hop2) or hip+hop. Depending on the cellular expression of the PAC1 receptor isoform, the receptor may be differentially coupled to adenylyl cyclase, phospholipase C, MAPK or Akt pathways, among others. There are also PAC1 receptor splice variants in the N-terminal extracellular domain of the receptor which may impact receptor function and activation. Splice variants have not been described for the VPAC1/VPAC2 receptors. The VPAC1 and VPAC2 receptors appear to be preferentially coupled to adenylyl cyclase. Recent work has shown that β-arrestin-mediated PAC1 receptor internalization and endosomal signaling is the primary driver of long term cellular ERK activation.

Over the last several years, the PACAP/PAC1 receptor system has been associated with stress-related anxiety-like behavior (Hammack et al., 2009; Stroth and Eiden, 2010; Roman et al., 2014; Missig et al., 2014, 2017; Lezak et al., 2014; Miles et al., 2018), including post-traumatic stress disorder (PTSD, Ressler et al., 2011; Almli et al., 2013; Jovanovic et al., 2013; Uddin et al., 2013; Wang et al., 2013; Chen et al., 2013; Pohlack et al., 2015; Hammack and May, 2015). In addition, chronic stress increases PACAP and PAC1 receptor transcripts in the bed nucleus of the stria terminalis (BNST) and hypothalamus (Hammack et al., 2009), two limbic brain region that participate in stress responses and behavior. Infusions of PACAP or maxadilan (a specific PAC1 receptor agonist) into the BNST are anxiogenic and anorexic (analogous to stress-mediated decreases in feeding behavior) (Roman et al., 2014). Similar anxiogenic responses were elicited following PACAP infusions directly into the central amygdala (CeA, Missig et al., 2014; 2017). Conversely, antagonism of PAC1 receptor signaling with PACAP6-38 (N-terminally truncated form of PACAP—see below) during chronic stress blocked both anxiety-related and diminished feeding behaviors (Roman et al., 2014). Further, elevated blood PACAP levels and polymorphism in the estrogen responsive element (ERE) of the PAC1 receptor gene have been associated with PTSD symptoms in women (Ressler et al., 2011). These observations have been reproduced independently in other laboratories (Hammack and May, 2015; Almli et al., 2013; Jovanovic et al., 2013; Uddin et al., 2013; Wang et al., 2013; Chen et al., 2013; Pohlack et al., 2015).

PACAP is expressed in a population of sensory dorsal root ganglion neurons and can be induced upon injury or inflammation paradigms. More recently, our laboratories have shown that PACAP in nociceptive (pain) spino-parabrachio-amygdaloid pathway is important in mediating the emotional components of pain (Missig et al., 2014; 2017). Briefly, PACAP in the peripheral pain circuits relay signals that ultimately terminate in the lateral capsular division of the amygdala (CeLC), a limbic nucleus well studied for its roles in stress and fear (Rouwette et al., 2012; Gauriau and Bernard, 2002). Stress and chronic pain (including migraine) are comorbid. Nearly 50% of patients with psychopathologies have chronic pain; conversely, 30-40% of patients with chronic pain present anxiety disorders including PTSD (Otis et al., 2003; McFarlane et al., 1994; McWilliams et al., 2003; Asmundson and Katz, 2009; Moeller-Bertram et al., 2012; Norman et al., 2008; Scioli-Salter et al., 2015). Hence this particular PACAP neurocircuit may represent a means by which chronic pain can induce maladaptive neuroplasticity in limbic neurons leading to behavioral abnormalities including anxiety disorders, panic, generalized anxiety disorder, and PTSD. PACAP infusions into the amygdala increase anxiety-like responses and nociceptive sensitivity; these responses can be blocked in in vivo models of chronic pain using a PACAP6-38 PAC1 receptor antagonist (Missig et al., 2017).

Supporting PACAP roles in pain, several recent studies have shown that PACAP and PAC1 receptor signaling is associated with migraine (Syed et al., 2012; Edvinsson et al., 2018; Akerman and Goadsby, 2015), i.e., PACAP infusions in humans facilitate migraine development. Notably, there are a number of similarities between PACAP and calcitonin gene related peptide (CGRP). CGRP has been implicated in migraine and may also participate in stress-associated behavioral responses (Karsan and Goadsby, 2015), PACAP and CGRP are frequently colocalized in sensory neurons, and PACAP/CGRP signaling mechanisms are similar. CGRP antagonists have been shown to be effective in treating migraine (Tepper, 2018) but the drugs developed to date cause liver toxicity. Given the demonstrated efficacy of CGRP receptor antagonists to ameliorate migraine, a comparable effect may be anticipated for PACAP antagonists.

Importantly, the behavioral and chronic pain responses are dependent on cellular ERK activation. Stress and chronic pain paradigms increase phosphorylated ERK signaling in the brain; conversely, stress and chronic pain responses can be attenuated by inhibitors of the MEK/ERK signaling cascade (Carrasquillo and Gereau, 2007). PACAP infusions into limbic areas increase ERK activation and c-fos induction (a marker for increased neuronal activity) in parallel with behavioral and pain responses; these PACAP responses can be attenuated with MEK/ERK inhibitors (Missig et al., 2017). Notably, current work has shown that cellular PACAP/PAC1 receptor ERK signaling is mediated largely following PAC1 receptor internalization and endosomal signaling (May et al., 2014; May and Parsons; 2016). In coherence, inhibitors of endocytic mechanisms can block PACAP-stimulated pain sensitivity (Missig et al., 2017).

Despite the associations between PACAP signaling and stress-associated behavioral disorders and chronic pain, there are no small molecule antagonists to the PACAP receptors for potential therapeutics. There are a variety of peptide antagonists based on the truncated forms of PACAP. Further, a deletion variant of maxadilan, a salivary protein identified in sand-fly saliva has been identified as a specific PAC1 receptor antagonist. These peptide and protein antagonists are susceptible to degradation and typically do not cross the blood brain barrier. Hence, these compounds do not appear suitable for candidates for drug development. From these considerations, small molecule antagonists, especially to the PAC1 receptor are desirable for potential therapeutic applications in stress-related psychopathologies and pain-associated disorders. From current work, PACAP/PAC1 receptor canonical plasma membrane signaling may not be the primary drivers leading to the maladaptation's in stress-related disorders (PTSD) and chronic pain; PACAP/PAC1 receptor internalization and intracellular endosomal signaling, especially ERK activation, appear key in mediating the pathologies. Many putative small molecule antagonists described in the literature have no apparent effects on receptor internalization and signaling. Described above, there are currently no or few small molecule antagonist to the PACAP receptors, including the PACAP-specific PAC1 receptors implicated in stress- and pain-related behaviors and responses. N-terminally truncated PACAP peptides (i.e., PACAP6-38) can behave as PAC1 receptor antagonists. As proof of principle demonstrating the abilities for PACAP antagonists to inhibit stress-related and pain responses, the infusion of PACAP6-38 into the BNST or amygdala attenuated anxiety-like behavior in chronic stress paradigms (Roman et al., 2014) and blocked nociceptive responses in a sciatic nerve ligation model of chronic pain (Missig et al., 2017). Hence PAC1 receptor antagonists have therapeutic potential in psychopathologies and chronic pain-related disorders.

In addition to N-terminally truncated PACAP analogs, a deletion variant of the maxadilan protein (maxd4, M65) can behave as PAC1 receptor antagonists (Moro and Lerner, 1997; Moro et al., 1999). However, peptidergic antagonists are susceptible to degradation and do not readily cross the blood brain barrier. Accordingly, a potent and efficacious small molecule PAC1 receptor antagonist is highly desirable for treatment in stress-related disorders (generalized anxiety disorder, panic disorder, PTSD) and chronic pain-related disorders (migraine, rheumatoid arthritis and related inflammatory pain, musculoskeletal pain). As PACAP signaling has been identified in intersecting stress and pain neurocircuits, the ability for small molecule antagonists to attenuate the maladaptive effects of PACAP can have broad therapeutic implications. From current work, the PACAP receptor signaling events mediating these pathological responses may not only be mediated by plasma membrane delimited effectors (adenylyl cyclase, phospolipase C) but dependent on intracellular endosomal signaling, especially ERK activation, following receptor internalization. Hence small molecule compounds that preferentially block PACAP receptor internalization and endosomal signaling have high efficacy in attenuating these behavioral and pain disorders.

SUMMARY OF THE INVENTION

The small molecules of this disclosure (Formula (I), Formula (II), and I-18 to I-26) are efficacious in blocking PAC1 receptor endosomal signaling and PACAP-induced stress-related behaviors. Hence, these compounds have potential therapeutic applications. The invention entails the development of small molecules that can behave as antagonists to PACAP receptors (e.g. PAC1 receptors), and their methods of use. These molecules may have clinical benefits in ameliorating neurological disorders including, but not limited to, stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)), neuropathic and emotional pain, and related psycho- and pain-associated pathologies.

In contrast to the compounds of the present disclosure, the glucagon/PACAP receptor small molecule antagonists described to date (i.e. Beebe et al., Bioorg. Med. Chem. Lett. 18:2162-2166; 2008; Ling et al., J. Med. Chem. 44:3141-3149, 2001) demonstrate biased responses for plasma membrane signaling events and do not block PACAP receptor internalization and endosomal signaling; accordingly these earlier glucagon/PACAP receptor small molecule antagonists are not suited for treating stress-related and chronic pain disorder therapeutics.

The compounds and methods described herein are novel in their abilities to demonstrate efficacy in blocking PACAP receptor plasma membrane signaling, and PACAP receptor internalization and endosomal signaling, including ERK activation. Hence, these compounds have therapeutic potential for neurological disorders (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)).

From previous work (Beebe et al., 2008) acyl hydrazide compounds appear to have the potential to antagonize PACAP plasma membrane calcium signaling; however, while these candidate compounds (including compound I-21; Beebe et al., 2008, compound 14) can attenuate PAC1 receptor mediated calcium flux, they have modest effects in blocking PAC1 receptor internalization and endosomal ERK activation. These results are not surprising given the bias agonism/antagonism states (how different ligands can cause G protein coupled receptors to adopt altered conformational states resulting in differential signaling responses) that are now understood to exist for G protein coupled receptors.

From background and signaling data above, we have posited that for therapeutic potential, PAC1 receptor antagonists should demonstrate efficacy in blunting both plasma membrane (i.e., calcium flux) and endosomal ERK signaling. The compounds of this disclosure have been prepared and among these, several new compounds have shown efficacy in inhibiting PACAP/PAC1 receptor-stimulated plasma membrane signaling, internalization and endosomal ERK activation in a stable human PAC1 receptor-HEK cell line. Compound I-19 is notable in apparent efficacy in completely blocking plasma membrane receptor-mediated calcium flux without apparent effects on ligand-mediated ERK activation (see FIGS. 7 and 16). I-19 may be useful in blocking PAC1 receptor-mediated responses that are dependent on plasma membrane signaling.

Exemplary compounds of the disclosure include, but are not limited to:

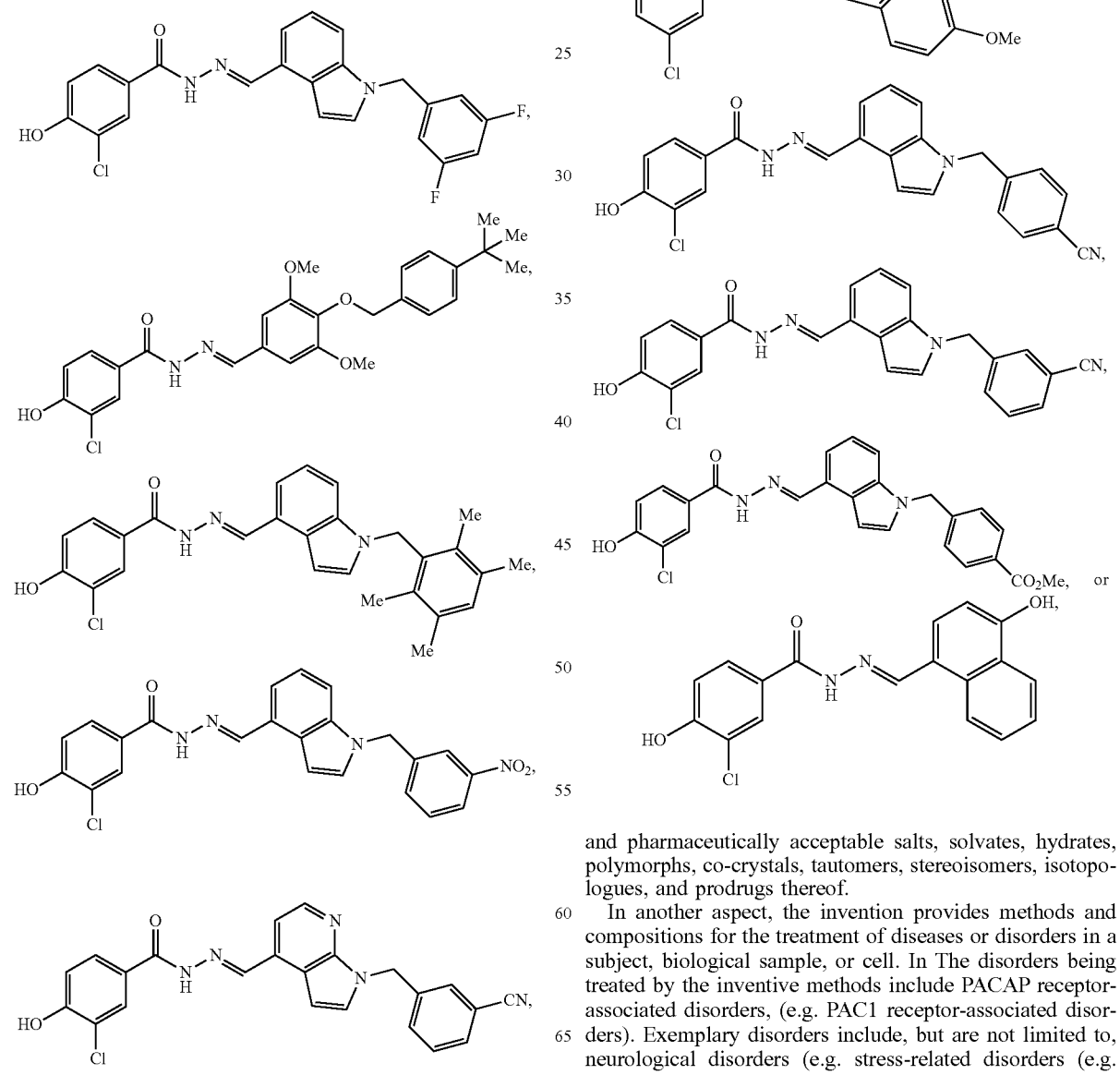

and pharmaceutically acceptable salts, solvates, hydrates, polymorphs, co-crystals, tautomers, stereoisomers, isotopologues, and prodrugs thereof.

In another aspect, the invention provides methods and compositions for the treatment of diseases or disorders in a subject, biological sample, or cell. In The disorders being treated by the inventive methods include PACAP receptor-associated disorders, (e.g. PAC1 receptor-associated disorders). Exemplary disorders include, but are not limited to, neurological disorders (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)). The methods of the invention include administering to a subject in need of treatment of a disease or disorder a therapeutically effective amount of a compound of Formula (I), Formula (II), or compounds I-18 to I-26, or a pharmaceutically acceptable salt, solvate, hydrate, polymorph, co-crystal, tautomer, stereoisomer, isotopologue, or prodrug thereof.

In another aspect, the present disclosure provides pharmaceutical compositions including a compound described herein, and optionally a pharmaceutically acceptable excipient. In certain embodiments, the pharmaceutical compositions described herein include a therapeutically or prophylactically effective amount of a compound described herein. The pharmaceutical composition may be useful for treating a disease or disorder (e.g., stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)) in a subject in need thereof, or inhibiting the activity of a PACAP receptor in a biological sample, tissue, or cell.

In another aspect, the present disclosure provides pharmaceutical compositions including a compound described herein, and optionally a pharmaceutically acceptable excipient. In certain embodiments, the pharmaceutical compositions described herein include a therapeutically or prophylactically effective amount of a compound described herein. The pharmaceutical composition may be useful for inhibiting the activity of binding a PACAP-receptor in a subject, biological sample, tissue, or cell. The pharmaceutical composition may inhibit PACAP receptor internalization and endosomal signaling in a subject, biological sample, tissue, or cell. The pharmaceutical composition may also block ERK activation in a subject, biological sample, tissue, or cell. The pharmaceutical composition may be useful for treating and/or preventing a disease or disorder (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)), in a subject in need thereof.

In another aspect, described herein are methods for treating and/or preventing a neurological disorder (e.g., stress-related disorders (e.g. chronic stress, post-traumatic stress disorder (PTSD), anxiety, or general anxiety disorder), pain-related disorders (e.g. chronic pain, primary headache disorders, or migraines), eating disorders (e.g. orthorexia, or anorexia nervosa), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)) in a subject.

Another aspect relates to methods of modulating the activity of a PACAP receptor (e.g., PAC1) using a compound described herein in a biological sample (e.g., cell, or tissue). In another aspect, described herein are methods of inhibiting PACAP receptor (e.g. PAC1 receptor) internalization and endosomal signaling using a compound described herein in a biological sample (e.g., cell, or tissue). In another aspect, described herein are methods of inhibiting ERK activation using a compound described herein in a biological sample (e.g., cell, or tissue). In another aspect, described herein are methods of modulating the activity of a PACAP receptor (e.g., PAC1) using a compound described herein in a subject. In another aspect, described herein are methods of inhibiting PACAP receptor internalization and endosomal signaling using a compound described herein in a subject. In another aspect, described herein are methods of inhibiting ERK activation using a compound described herein in a subject.

In another aspect, the present disclosure provides compounds of Formula (I), and pharmaceutically acceptable salts, solvates, hydrates, polymorphs, co-crystals, tautomers, stereoisomers, isotopologues, prodrugs, and compositions thereof, for use in the treatment of a neurological disorder (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food or an opioid selected from heroin, fentanyl, codeine, hydrocodone, morphine, oxycodone, hydromorphone, and methadone)) in a subject.

In another aspect, the present disclosure provides compounds of Formula (II), and pharmaceutically acceptable salts, solvates, hydrates, polymorphs, co-crystals, tautomers, stereoisomers, isotopologues, prodrugs, and compositions thereof, for use in the treatment of a neurological disorder (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)) in a subject.

In another aspect, the present disclosure provides compounds I-18 to I-26, and pharmaceutically acceptable salts, solvates, hydrates, polymorphs, co-crystals, tautomers, stereoisomers, isotopologues, prodrugs, and compositions thereof, for use in the treatment of a neurological disorder (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g.

addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)) in a subject.

Another aspect of the present disclosure relates to kits comprising a container with a compound, or pharmaceutical composition thereof, as described herein. The kits described herein may include a single dose or multiple doses of the compound or pharmaceutical composition. The kits may be useful in a method of the disclosure. In certain embodiments, the kit further includes instructions for using the compound or pharmaceutical composition. A kit described herein may also include information (e.g., prescribing information) as required by a regulatory agency, such as the U.S. Food and Drug Administration (FDA).

The details of one or more embodiments of the invention are set forth herein. Other features, objects, and advantages of the invention will be apparent from the Detailed Description, Examples, figures, and Claims.

Definitions

Definitions of specific functional groups and chemical terms are described in more detail below. The chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in Thomas Sorrell, *Organic Chemistry*, University Science Books, Sausalito, 1999; Smith and March, *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3$^{rd}$ Edition, Cambridge University Press, Cambridge, 1987. The disclosure is not intended to be limited in any manner by the exemplary listing of substituents described herein.

Compounds described herein can comprise one or more asymmetric centers, and thus can exist in various isomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, *Stereochemistry of Carbon Compounds* (McGraw-Hill, NY, 1962); and Wilen, *Tables of Resolving Agents and Optical Resolutions* p. 268 (E. L. Eliel, Ed., Univ. of Notre Dame Press, Notre Dame, IN 1972). The invention additionally encompasses compounds described herein as individual isomers substantially free of other isomers, and alternatively, as mixtures of various isomers.

In a formula, ⁓ is a single bond where the stereochemistry of the moieties immediately attached thereto is not specified but can be any stereochemistry (e.g., D or L).

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}$F with $^{18}$F, or the replacement of $^{12}$C with $^{13}$C or $^{14}$C are within the scope of the disclosure. Such compounds are useful, for example, as analytical tools or probes in biological assays.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —$CF_3$, Bn). In certain embodiments, the alkyl group is an unsubstituted $C_{1-6}$ alkyl (e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-6}$ alkyl (e.g., —$CF_3$, Bn).

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("heteroC$_{1-10}$ alkyl"). In some embodiments, a heteroalkyl group is a saturated group having 1 to 9 carbon atoms and 1 or more heteroatoms within the parent chain ("heteroC$_{1-9}$ alkyl"). In some embodiments, a heteroalkyl group is a saturated group having 1 to 8 carbon atoms and 1 or more heteroatoms within the parent chain ("heteroC$_{1-8}$ alkyl"). In some embodiments, a heteroalkyl group is a saturated group having 1 to 7 carbon atoms and 1 or more heteroatoms within the parent chain ("heteroC$_{1-7}$ alkyl"). In some embodiments, a heteroalkyl group is a saturated group having 1 to 6 carbon atoms and 1 or more heteroatoms within the parent chain ("heteroC$_{1-6}$ alkyl"). In some embodiments, a heteroalkyl group is a saturated group having 1 to 5 carbon atoms and 1 or 2 heteroatoms within the parent chain ("heteroC$_{1-5}$ alkyl"). In some embodiments, a heteroalkyl group is a saturated group having 1 to 4 carbon atoms and for 2 heteroatoms within the parent chain ("heteroC$_{1-4}$ alkyl"). In some embodiments, a heteroalkyl group is a saturated group having 1 to 3 carbon atoms and 1 heteroatom within the parent chain ("heteroC$_{1-3}$ alkyl"). In some embodiments, a heteroalkyl group is a saturated group having 1 to 2 carbon atoms and 1 heteroatom within the parent chain ("heteroC$_{1-2}$ alkyl"). In some embodiments, a heteroalkyl group is a saturated group having 1 carbon atom and 1 heteroatom ("heteroC$_1$ alkyl"). In some embodiments, a heteroalkyl group is a saturated group having 2 to 6 carbon atoms and 1 or 2 heteroatoms within the parent chain ("heteroC$_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted heteroC$_{1-10}$ alkyl. In certain embodiments, the heteroalkyl group is a substituted heteroC$_{1-10}$ alkyl.

The term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, Berge et al., describe pharmaceutically acceptable salts in detail in *J. Pharmaceutical Sciences,* 1977, 66, 1-19, incorporated herein by reference. Pharmaceutically acceptable salts of the compounds of this invention include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid, and perchloric acid or with organic acids such as acetic acid, oxalic acid, maleic acid, tartaric acid, citric acid, succinic acid, or malonic acid. These salts could be formed by protonation of the compound with the requisite acid, or by other methods known in the art such as ion exchange or by using other methods known in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and N$^+$(C$_{1-4}$ alkyl)$_4^-$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

The term "solvate" refers to forms of the compound that are associated with a solvent, usually by a solvolysis reaction. This physical association may include hydrogen bonding. Conventional solvents include water, methanol, ethanol, acetic acid, DMSO, THF, diethyl ether, and the like. The compounds of Formula (I) may be prepared, e.g., in crystalline form, and may be solvated. Suitable solvates include pharmaceutically acceptable solvates and further include both stoichiometric solvates and non-stoichiometric solvates. In certain instances, the solvate will be capable of isolation, for example, when one or more solvent molecules are incorporated in the crystal lattice of a crystalline solid. "Solvate" encompasses both solution-phase and isolable solvates. Representative solvates include hydrates, ethanolates, and methanolates.

The term "hydrate" refers to a compound that is associated with water. Typically, the number of the water molecules contained in a hydrate of a compound is in a definite ratio to the number of the compound molecules in the hydrate. Therefore, a hydrate of a compound may be represented, for example, by the general formula R·x H$_2$O, wherein R is the compound and wherein x is a number greater than 0. A given compound may form more than one type of hydrates, including, e.g., monohydrates (x is 1), lower hydrates (x is a number greater than 0 and smaller than 1, e.g., hemihydrates (R·0.5 H$_2$O)), and polyhydrates (x is a number greater than 1, e.g., dihydrates (R·2 H$_2$O) and hexahydrates (R·6 H$_2$O)).

The term "tautomers" refer to compounds that are interchangeable forms of a particular compound structure, and that vary in the displacement of hydrogen atoms and electrons. Thus, two structures may be in equilibrium through the movement of π electrons and an atom (usually H). For example, enols and ketones are tautomers because they are rapidly interconverted by treatment with either acid or base. Another example of tautomerism is the aci- and nitro-forms of phenylnitromethane, that are likewise formed by treatment with acid or base.

Tautomeric forms may be relevant to the attainment of the optimal chemical reactivity and biological activity of a compound of interest.

It is also to be understood that compounds that have the same molecular formula but differ in the nature or sequence of bonding of their atoms or the arrangement of their atoms in space are termed "isomers." Isomers that differ in the arrangement of their atoms in space are termed "stereoisomers."

Stereoisomers that are not mirror images of one another are termed "diastereomers" and those that are non-superimposable mirror images of each other are termed "enantiomers." When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture."

The term "isotopologue" refers to compounds that differ only in their isotopic composition. Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}F$ with $^{18}F$, or the replacement of $^{12}C$ with $^{13}C$ or $^{14}C$ are within the scope of the disclosure. Such compounds are useful, for example, as analytical tools or probes in biological assays.

The term "polymorphs" refers to a crystalline form of a compound (or a salt, hydrate, or solvate thereof) in a particular crystal packing arrangement. All polymorphs have the same elemental composition. Different crystalline forms usually have different X-ray diffraction patterns, infrared spectra, melting points, density, hardness, crystal shape, optical and electrical properties, stability, and solubility. Recrystallization solvent, rate of crystallization, storage temperature, and other factors may cause one crystal form to dominate. Various polymorphs of a compound can be prepared by crystallization under different conditions.

The term "prodrugs" refer to compounds, including derivatives of the compounds of Formula (I), Formula (II), or compounds I-18 to I-26, which have cleavable groups and become by solvolysis or under physiological conditions the compounds of Formula (I), Formula (II), or compounds I-18 to I-26, which are pharmaceutically active in vivo. Such examples include, but are not limited to, ester derivatives and the like. Other derivatives of the compounds of this invention have activity in both their acid and acid derivative forms, but in the acid sensitive form often offers advantages of solubility, tissue compatibility, or delayed release in the mammalian organism (see, Bundgard, H., *Design of Prodrugs, pp.* 7-9, 21-24, Elsevier, Amsterdam 1985). Prodrugs include acid derivatives well known to practitioners of the art, such as, for example, esters prepared by reaction of the parent acid with a suitable alcohol, or amides prepared by reaction of the parent acid compound with a substituted or unsubstituted amine, or acid anhydrides, or mixed anhydrides. Simple aliphatic or aromatic esters, amides, and anhydrides derived from acidic groups pendant on the compounds of this invention are particular prodrugs. In some cases it is desirable to prepare double ester type prodrugs such as (acyloxy)alkyl esters or ((alkoxycarbonyl)oxy)alkylesters. $C_1$-$C_8$ alkyl, $C_2$-$C_8$ alkenyl, $C_2$-$C_8$ alkynyl, aryl, $C_7$-$C_{12}$ substituted aryl, and $C_7$-$C_{12}$ arylalkyl esters.

A "subject" to which administration is contemplated includes, but is not limited to, humans (i.e., a male or female of any age group, e.g., a pediatric subject (e.g., infant, child, adolescent) or adult subject (e.g., young adult, middle-aged adult, or senior adult)) and/or other non-human animals, for example, mammals (e.g., primates (e.g., cynomolgus monkeys, rhesus monkeys); commercially relevant mammals such as cattle, pigs, horses, sheep, goats, cats, and/or dogs) and birds (e.g., commercially relevant birds such as chickens, ducks, geese, and/or turkeys). In certain embodiments, the animal is a mammal. The animal may be a male or female and at any stage of development. A non-human animal may be a transgenic animal.

The terms "administer," "administering," or "administration," refers to implanting, absorbing, ingesting, injecting, inhaling, or otherwise introducing an inventive compound, or a pharmaceutical composition thereof.

The terms "treatment," "treat," and "treating" refer to reversing, alleviating, or inhibiting the progress of a "pathological condition" (e.g., a disease, disorder, or condition, or one or more signs or symptoms thereof) described herein. In some embodiments, treatment may be administered after one or more signs or symptoms have developed or have been observed. In other embodiments, treatment may be administered in the absence of signs or symptoms of the disease or condition. For example, treatment may be administered to a susceptible individual prior to the onset of symptoms (e.g., in light of a history of symptoms and/or in light of genetic or other susceptibility factors). Treatment may also be continued after symptoms have resolved, for example, to delay or prevent recurrence.

The terms "condition," "disease," and "disorder" are used interchangeably.

The term "modulate" refers to an increase or decrease of a biological event (e.g., the amount of receptor internalization, or ERK activation) in response to contact with a compound of the invention, to a level that is higher or lower than an initial or other appropriate reference level, which may, for example, be a baseline level of a target. Examples of modulating agents include, but are not limited to agonists and antagonists.

The term "receptor" refers to any protein molecule that receives a signal from outside or inside a cell. In general, receptors are membrane bound proteins. A receptor may be a peripheral membrane protein, an integral membrane protein, or any protein that interacts with the cellular membrane. A receptor may be comprised of a single protein or a complex of two or more proteins. Receptors induce a type of cellular response when a chemical signal or molecule binds to the receptor. A receptor may also refer to any drug target, such as an enzyme, transporter, or ion channel that is the target of a drug. Examples of receptors include, but are not limited to, ionotropic receptors, PACAP receptors (e.g. PAC1), G-protein coupled receptors, receptor tyrosine kinases, and nuclear receptors.

The term "antagonist" refers to an agent that (i) decreases or suppresses one or more effects of another agent; and/or (ii) decreases or suppresses one or more biological events. In some embodiments, an antagonist may reduce level and/or activity of one or more agents that it targets. In various embodiments, antagonists may be or include agents of various chemical class including, for example, small molecules, acyl hydrazides, polypeptides, nucleic acids, carbohydrates, lipids, metals, and/or other entity that shows the relevant antagonistic activity. An antagonist may be direct (in which case it exerts its influence directly upon its target) or indirect (in which case it exerts its influence by other than binding to its target; e.g., by interacting with a regulator of the target, for example so that level or activity of the target is altered). In some embodiments, an antagonist may be a receptor antagonist, e.g., a receptor ligand or drug that blocks or dampens a biological response by binding to and blocking a receptor rather than activating it like an agonist.

The term "agonist" refers to an agent that (i) increases or induces one or more effects of another agent; and/or (ii) increases or induces one or more biological events. In some embodiments, an agonist may increase level and/or activity of one or more agents that it targets. In various embodiments, agonists may be or include agents of various chemical class including, for example, small molecules, polypeptides, nucleic acids, carbohydrates, lipids, metals, and/or other entity that shows the relevant agonistic activity. An agonist may be direct (in which case it exerts its influence directly upon its target) or indirect (in which case it exerts its influence by other than binding to its target; e.g., by interacting with a regulator of the target, for example so that level or activity of the target is altered). A partial agonist can act as a competitive antagonist in the presence of a full agonist, as it competes with the full agonist to interact with its target and/or a regulator thereof, thereby producing (i) a decrease in one or more effects of another agent, and/or (ii) a decrease in one or more biological events, as compared to that observed with the full agonist alone.

The term "inhibit" or "inhibition" in the context of modulating level (e.g., expression and/or activity) of a target (e.g., a PACAP receptor (e.g. PAC1)) is not limited to only total inhibition. Thus, in some embodiments, partial inhibition or relative reduction is included within the scope of the term "inhibition." In some embodiments, the term refers to a reduction of the level (e.g., expression, internalization, and/or activity) of a target (e.g., a PACAP receptor (e.g. PAC1) to a level that is reproducibly and/or statistically significantly lower than an initial or other appropriate reference level, which may, for example, be a baseline level of a target. In some embodiments, the term refers to a reduction of the level (e.g., expression and/or activity) of a target to a level that is less than 75%, less than 50%, less than 40%, less than 30%, less than 25%, less than 20%, less than 10%, less than 9%, less than 8%, less than 7%, less than 6%, less than 5%, less than 4%, less than 3%, less than 2%, less than 1%, less than 0.5%, less than 0.1%, less than 0.01%, less than 0.001%, or less than 0.0001% of an initial level, which may, for example, be a baseline level of a target.

An "effective amount" of a compound of Formula (I), Formula (II), or compounds I-18 to I-26, refers to an amount sufficient to elicit the desired biological response, i.e., treating the condition. As will be appreciated by those of ordinary skill in this art, the effective amount of a compound of Formula (I) may vary depending on such factors as the desired biological endpoint, the pharmacokinetics of the compound, the condition being treated, the mode of administration, and the age and health of the subject. An effective amount encompasses therapeutic and prophylactic treatment. For example, in treating cancer, an effective amount of an inventive compound may reduce the tumor burden or stop the growth or spread of a tumor.

A "therapeutically effective amount" of a compound of Formula (I), Formula (II), or compounds I-18 to I-26, is an amount sufficient to provide a therapeutic benefit in the treatment of a condition or to delay or minimize one or more symptoms associated with the condition. A therapeutically effective amount of a compound means an amount of therapeutic agent, alone or in combination with other therapies, which provides a therapeutic benefit in the treatment of the condition. The term "therapeutically effective amount" can encompass an amount that improves overall therapy, reduces, or avoids symptoms or causes of the condition, or enhances the therapeutic efficacy of another therapeutic agent.

A "prophylactically effective amount" of a compound of Formula (I), Formula (II), or compounds I-18 to I-26, is an amount sufficient to prevent a condition, or one or more symptoms associated with the condition or prevent its recurrence. A prophylactically effective amount of a compound means an amount of a therapeutic agent, alone or in combination with other agents, which provides a prophylactic benefit in the prevention of the condition. The term "prophylactically effective amount" can encompass an amount that improves overall prophylaxis or enhances the prophylactic efficacy of another prophylactic agent.

The term "neurological disorder" refers to any disease or disorder of the nervous system, including diseases that involve the central nervous system (brain, brainstem and cerebellum), the peripheral nervous system (including cranial nerves), and the autonomic nervous system (parts of which are located in both central and peripheral nervous system). Examples of neurological diseases include, but are not limited to, stress-related disorders, pain-related disorders, panic disorders, panic attacks, eating disorders, and addiction. Stress-related disorders include, but are not limited to chronic stress, post-traumatic stress disorder (PTSD), anxiety, and general anxiety disorder. Pain-related disorders include, but are not limited to chronic pain, primary headache disorders, and migraines. Eating disorders include, but are not limited to orthorexia, and anorexia nervosa. Addictions include, but are not limited to addiction to a substance (e.g. cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone).

The term "biological sample" refers to any sample including tissue samples (such as tissue sections and needle biopsies of a tissue); cell samples (e.g., cytological smears (such as Pap or blood smears) or samples of cells obtained by microdissection); samples of whole organisms (such as samples of yeasts or bacteria); or cell fractions, fragments or organelles (such as obtained by lysing cells and separating the components thereof by centrifugation or otherwise). Other examples of biological samples include blood, serum, urine, semen, fecal matter, cerebrospinal fluid, interstitial fluid, mucus, tears, sweat, pus, biopsied tissue (e.g., obtained by a surgical biopsy or needle biopsy), nipple aspirates, milk, vaginal fluid, saliva, swabs (such as buccal swabs), or any material containing biomolecules that is derived from a first biological sample. Biological samples also include those biological samples that are transgenic, such as a transgenic oocyte, sperm cell, blastocyst, embryo, fetus, donor cell, or cell nucleus.

DETAILED DESCRIPTION OF CERTAIN EMBODIMENTS OF THE INVENTION

Figure 1:
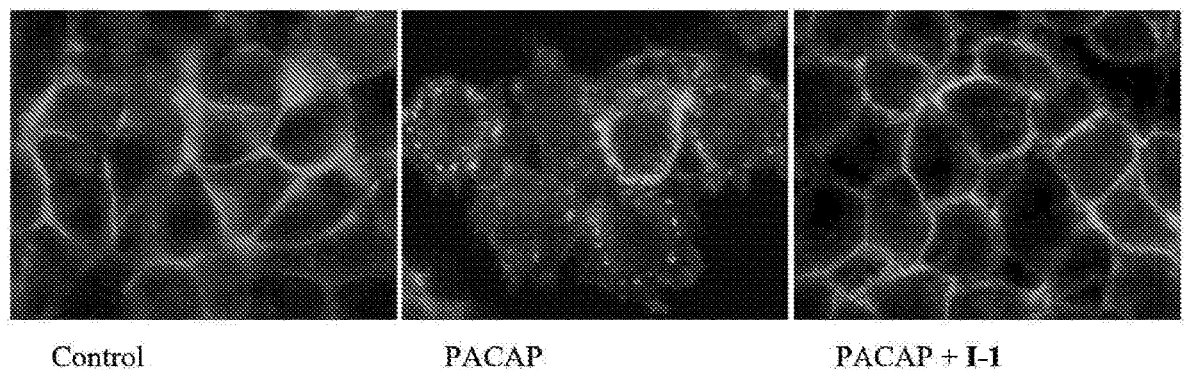
FIG. 1 depicts treatment of HEK cells treated with PACAP and PACAP/compound I-1.

The present invention provides compounds that act as antagonists for a PACAP-receptor (e.g. PAC1), and pharmaceutical compositions thereof, for the prevention and treatment of a disease or disorder in a subject. In certain embodiments, the compounds act as antagonists to PACAP receptors (e.g. PAC1). In certain embodiments, the compounds are irreversible antagonist for PACAP receptors (e.g. PAC1). In certain embodiments, the compounds are reversible antagonist for PACAP receptors (e.g. PAC1). The present invention further provides methods of using the compounds described herein, e.g., as biological probes to study the antagonism of PACAP receptors (e.g. PAC1), and as therapeutics, e.g., in the prevention and treatment of diseases or disorders associated with PACAP receptor activity or internalization, or ERK activation. In certain embodiments, the diseases or disorders include, but are not limited to, neurological disorders, e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)).

Compounds

In one aspect of the present invention, provided are compounds of Formula (I):

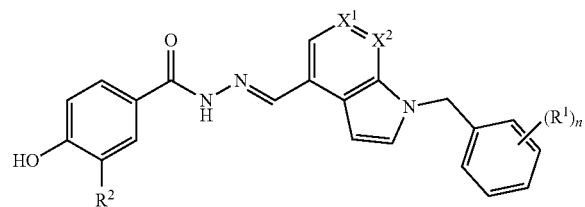

or a pharmaceutically acceptable salt, solvate, hydrate, polymorph, co-crystal, tautomer, isotopologue, stereoisomer, or prodrug thereof, wherein:

$R^1$ is independently optionally substituted aryl, optionally substituted heteroaryl, halogen, —CN, —$NO_2$, or —C(=O)$OR^a$, wherein each $R^a$ is independently H, or optionally substituted $C_{1-6}$ alkyl;

$R^2$ is halogen or —$NO_2$;

$X^1$ and $X^2$ are independently C—H or N; and n is 1, 2, or 3.

Formula (I) contains the substituent $R^1$. Formula (I) contains n instances of $R^1$, wherein n is an integer between 1 and 3. In certain embodiments, n is 1. In certain embodiments, n is 2. In certain embodiments n is 3. In certain embodiments, at least one instance of $R^1$ is a halogen. In certain embodiments, at least one instance of $R^1$ is F. In certain embodiments, at least two instances of $R^1$ are F. In certain embodiments n is 2, and $R^1$ is F. In certain embodiments, at least one instance of $R^1$ is —CN. In certain embodiments, at least one instance of $R^1$ is —$NO_2$. In certain embodiments, at least one instance of $R^1$ is —C(=O)$OR^a$, wherein $R^a$ is optionally substituted $C_{1-6}$ alkyl (e.g. Me, Et, n-Pr). In certain embodiments, at least one instance of $R^1$ is $CO_2Me$. In certain embodiments, at least one instance of $R^1$ is optionally substituted aryl. In certain embodiments, at least one instance of $R^1$ is unsubstituted aryl. In certain embodiments, at least one instance of $R^1$ is unsubstituted phenyl. In certain embodiments, at least one instance of $R^1$ is optionally substituted heteroaryl. In certain embodiments, $R^1$ is optionally substituted pyridine, pyrimidine, pyridazine, pyrazine, or triazine. In certain embodiments, $R^1$ is optionally substituted pyrimidine.

Formula (I) contains the substituent $X^1$. In certain embodiments, $X^1$ is C. In certain embodiments, $X^1$ is N. In certain embodiments, $X^1$ is N and at least one instance of $R^1$ is —CN. In certain embodiments, $X^1$ is C, and at least one instance of $R^1$ is —CN. In certain embodiments, $X^1$ is C, and at least one instance of $R^1$ is —$NO_2$. In certain embodiments, $X^1$ is C, and at least one instance of $R^1$ is a halogen. In certain embodiments, $X^1$ is C, and at least one instance of $R^1$ is F. In certain embodiments, $X^1$ is C, and at least one instance of $R^1$ is —C(=O)$OR^a$. In certain embodiments, $X^1$ is C, and at least one instance of $R^1$ is F. In certain embodiments, $X^1$ is C, and at least one instance of $R^1$ is —$CO_2Me$.

Formula (I) contains the substituent $X^2$. In certain embodiments, $X^2$ is C. In certain embodiments, $X^2$ is N. In certain embodiments, $X^2$ is N and at least one instance of $R^1$ is —CN. In certain embodiments, $X^2$ is C, and at least one instance of $R^1$ is —CN. In certain embodiments, $X^2$ is C, and at least one instance of $R^1$ is —$NO_2$. In certain embodiments, $X^2$ is C, and at least one instance of $R^1$ is a halogen. In certain embodiments, $X^2$ is C, and at least one instance of $R^1$ is F. In certain embodiments, $X^2$ is C, and at least one instance of $R^1$ is —C(=O)$OR^a$. In certain embodiments, $X^2$ is C, and at least one instance of $R^1$ is F. In certain embodiments, $X^2$ is C, and at least one instance of $R^1$ is —$CO_2Me$.

In certain embodiments, Formula (I) is of the Formula (I-a):

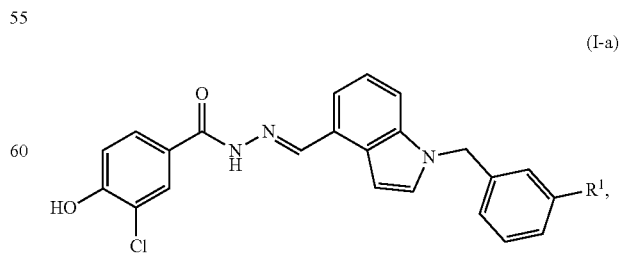

or pharmaceutically acceptable salts, solvates, hydrates, polymorphs, co-crystals, tautomers, isotopologues, stereoisomers, or prodrugs thereof, wherein $R^1$ is independently optionally substituted aryl, optionally substituted heteroaryl, halogen, —CN, —NO$_2$, or —C(=O)OR$^a$, wherein each $R^a$ is independently H, or optionally substituted C$_{1-6}$ alkyl.

In certain embodiments, Formula (I) is of the Formula (I-b):

(I-b)

or pharmaceutically acceptable salts, solvates, hydrates, polymorphs, co-crystals, tautomers, isotopologues, stereoisomers, or prodrugs thereof, wherein $R^1$ is independently optionally substituted aryl, optionally substituted heteroaryl, halogen, —CN, —NO$_2$, or —C(=O)OR$^a$, wherein each $R^a$ is independently H, or optionally substituted C$_{1-6}$ alkyl.

In certain embodiments, Formula (I) is of the Formula (I-c):

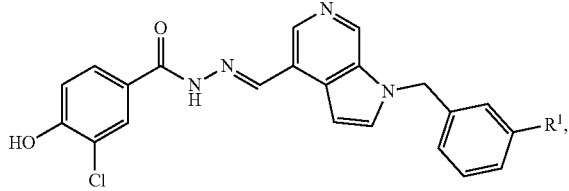

(I-c)

or pharmaceutically acceptable salts, solvates, hydrates, polymorphs, co-crystals, tautomers, isotopologues, stereoisomers, or prodrugs thereof, wherein $R^1$ is independently optionally substituted aryl, optionally substituted heteroaryl, halogen, —CN, —NO$_2$, or —C(=O)OR$^a$, wherein each $R^a$ is independently H, or optionally substituted C$_{1-6}$ alkyl.

In certain embodiments, Formula (I) is of the Formula (I-d):

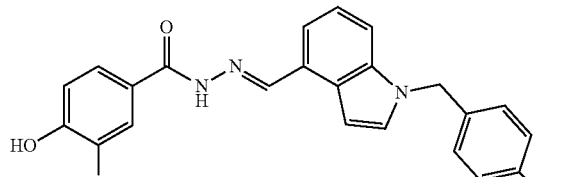

(I-d)

or pharmaceutically acceptable salts, solvates, hydrates, polymorphs, co-crystals, tautomers, isotopologues, stereoisomers, or prodrugs thereof, wherein $R^1$ is independently optionally substituted aryl, optionally substituted heteroaryl, halogen, —CN, —NO$_2$, or —C(=O)OR$^a$, wherein each $R^a$ is independently H, or optionally substituted C$_{1-6}$ alkyl.

In certain embodiments, Formula (I) is of the Formula (I-e):

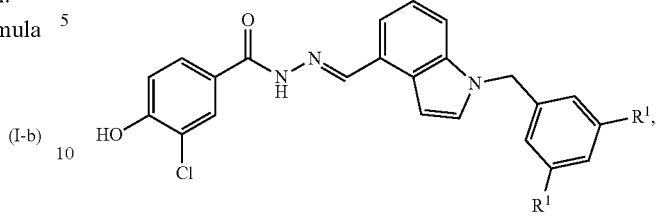

(I-e)

or pharmaceutically acceptable salts, solvates, hydrates, polymorphs, co-crystals, tautomers, isotopologues, stereoisomers, or prodrugs thereof, wherein $R^1$ is independently optionally substituted aryl, optionally substituted heteroaryl, halogen, —CN, —NO$_2$, or —C(=O)OR$^a$, wherein each $R^a$ is independently H, or optionally substituted C$_{1-6}$ alkyl.

In certain embodiments, a compound of Formula (I) is of the formula:

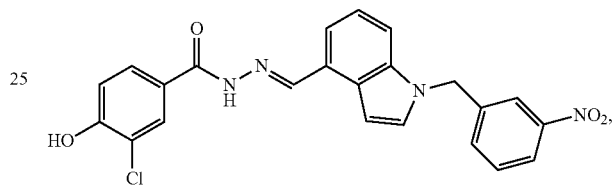

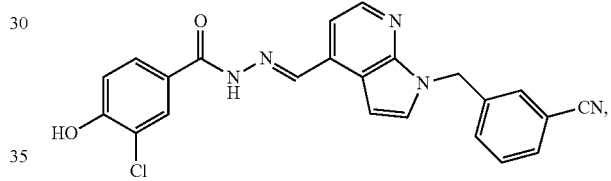

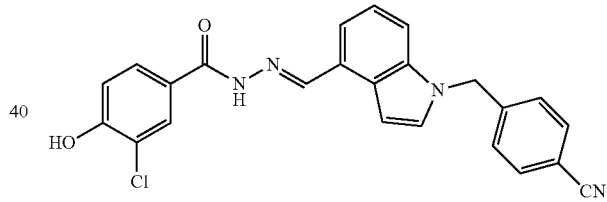

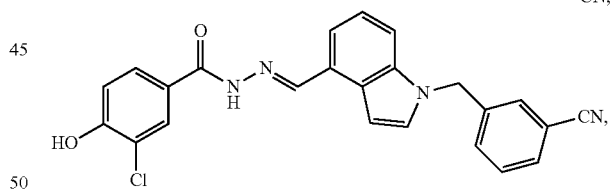

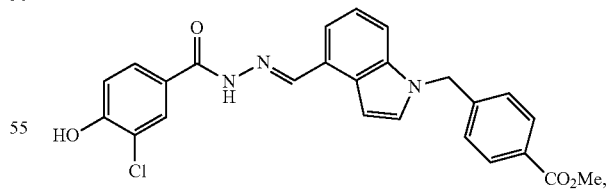

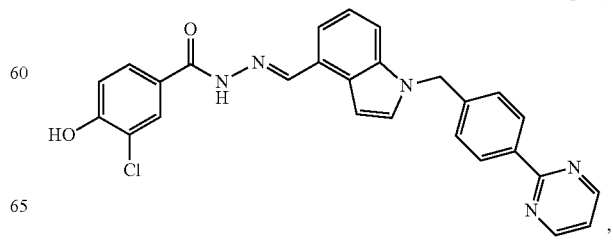

-continued

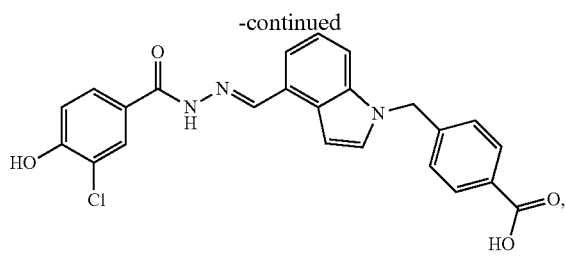

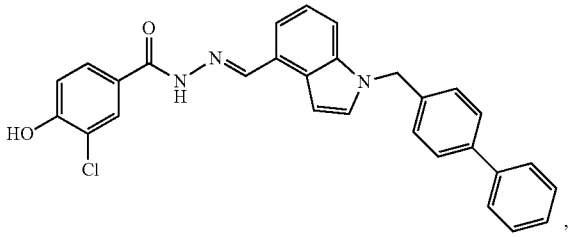

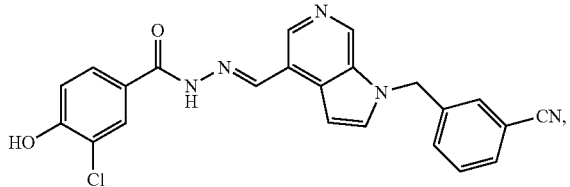

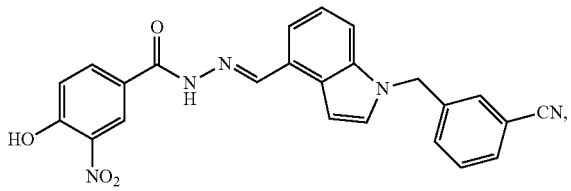

or a salt thereof.

In one aspect of the present invention, provided are compounds of Formula (II):

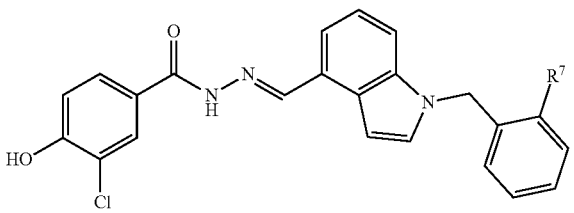

or a pharmaceutically acceptable salt, solvate, hydrate, polymorph, co-crystal, tautomer, isotopologue, stereoisomer, or prodrug thereof, wherein:

$R^7$ is halogen, —CF$_3$, —CN, —NO$_2$, or —C(=O)OR$^c$, wherein each R$^c$ is independently optionally substituted C$_{1-6}$ alkyl.

Formula (II) contains the substituent $R^7$. In certain embodiments, $R^7$ is halogen. In certain embodiments, $R^7$ is —CF$_3$. In certain embodiments, $R^7$ is —NO$_2$. In certain embodiments, $R^7$ is —C(=O)OR$^c$, wherein each Reis independently optionally substituted C$_{1-6}$ alkyl (e.g., Me, Et, n-Pr).

In certain embodiments, Formula (II) is of the formula:

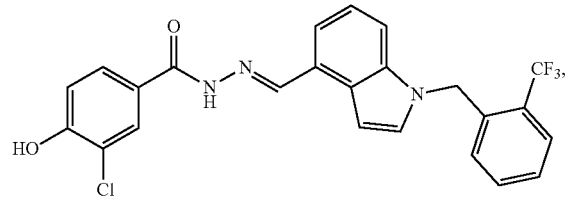 [SMILES: O=C(N/N=C/c1cccc2c1ccn2Cc1ccccc1C(F)(F)F)c1ccc(O)c(Cl)c1]

or a salt thereof.

In one aspect of the present invention, provided are compounds of Formula (III):

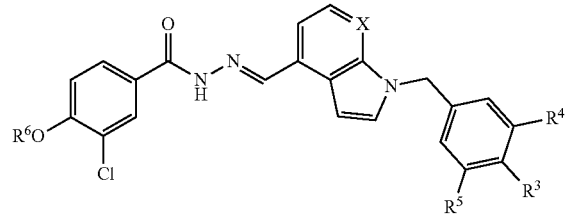

or a pharmaceutically acceptable salt, solvate, hydrate, polymorph, co-crystal, tautomer, isotopologue, stereoisomer, or prodrug thereof, wherein:

$R^3$ is hydrogen, halogen, —CF$_3$, —CN, —NO$_2$, —C(=O)OR$^c$, wherein each R$^c$ is independently optionally substituted C$_{1-6}$ alkyl;

$R^4$ and $R^5$ are independently halogen, —CF$_3$, —CN, —NO$_2$, or —C(=O)OR$^b$, wherein R$^b$ is optionally substituted C$_{1-6}$ alkyl;

$R^6$ is optionally substituted aryl, optionally substituted C$_{1-6}$ alkyl, or optionally substituted C$_{1-8}$ heteroalkyl; and X is C—H or N.

Formula (III) contains the substituent $R^3$. In certain embodiments, $R^3$ is H. In certain embodiments, $R^3$ is halogen. In certain embodiments, $R^3$ is F. In certain embodiments, $R^3$ is —CF$_3$. In certain embodiments, $R^3$ is —CN. In certain embodiments, $R^3$ is —NO$_2$. In certain embodiments, $R^3$ is —C(=O)OR$^c$, wherein R$^c$ is optionally substituted C$_{1-6}$ alkyl (e.g., Me, Et, n-Pr). In certain embodiments, $R^3$ is C(=O)OMe.

Formula (III) contains the substituent $R^4$. In certain embodiments, $R^4$ is halogen. In certain embodiments, $R^4$ is F. In certain embodiments, $R^4$ is —CF$_3$. In certain embodiments, $R^4$ is —CN. In certain embodiments, $R^4$ is —NO$_2$. In certain embodiments, $R^4$ is —C(=O)OR$^b$, wherein R$^b$ is optionally substituted C$_{1-6}$ alkyl (e.g., Me, Et, n-Pr).

Formula (III) contains the substituent $R^5$. In certain embodiments, $R^5$ is halogen. In certain embodiments, $R^5$ is F. In certain embodiments, $R^5$ is —CF$_3$. In certain embodiments, $R^5$ is —CN. In certain embodiments, $R^5$ is —NO$_2$. In certain embodiments, $R^5$ is —C(=O)OR$^b$, wherein R$^b$ is optionally substituted C$_{1-6}$ alkyl (e.g., Me, Et, n-Pr).

Formula (III) contains the substituent X. In certain embodiments, X is C—H. In certain embodiments, X is N. In certain embodiments, X is C—H, $R^5$ is —CF$_3$, and $R^4$ is —CF$_3$. In certain embodiments, X is C—H, $R^5$ is a halogen, and $R^4$ is a halogen. In certain embodiments, X is C—H, $R^5$ is —F, and $R^4$ is a halogen. In certain embodiments, X is C—H, $R^2$ is a halogen, and $R^4$ is F. In certain embodiments, X is C—H, $R^5$ is —F, and $R^4$ is —F.

In certain embodiments, Formula (III) is of the Formula (III-a):

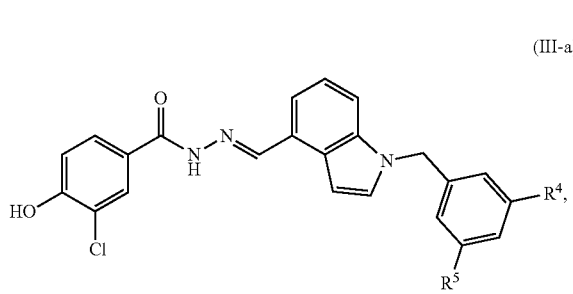

(III-a)

or pharmaceutically acceptable salts, solvates, hydrates, polymorphs, co-crystals, tautomers, isotopologues, stereoisomers, or prodrugs thereof, wherein $R^4$ and $R^5$ are independently halogen, —$CF_3$, —CN, —$NO_2$, or —C(=O)$OR^b$, wherein each $R^b$ is independently optionally substituted $C_{1-6}$ alkyl. In certain embodiments, $R^4$ and $R^5$ are the same. In certain embodiments, $R^4$ and $R^5$ are different.

In certain embodiments, Formula (III) is of the Formula (III-b):

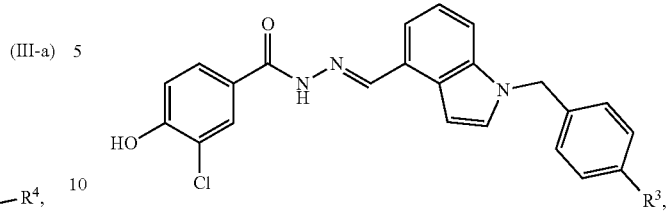

(III-b)

or pharmaceutically acceptable salts, solvates, hydrates, polymorphs, co-crystals, tautomers, isotopologues, stereoisomers, or prodrugs thereof, wherein $R^3$ is hydrogen, halogen, —$CF_3$, —CN, —$NO_2$, or —C(=O)$OR^c$, wherein $R^c$ is optionally substituted $C_{1-6}$ alkyl (e.g. Me, Et, n-Pr).

Formula (III-b) contains the substituent $R^3$. In certain embodiments, $R^3$ is H. In certain embodiments, $R^3$ is halogen. In certain embodiments, $R^3$ is F. In certain embodiments, $R^3$ is —$CF_3$. In certain embodiments, $R^3$ is —CN. In certain embodiments, $R^3$ is —$NO_2$. In certain embodiments, $R^3$ is —C(=O)$OR^c$, wherein $R^c$ is optionally substituted $C_{1-6}$ alkyl (e.g., Me, Et, n-Pr). In certain embodiments, $R^3$ is C(=O)OMe.

In certain embodiments, a compound of Formula (III) is of the formula:

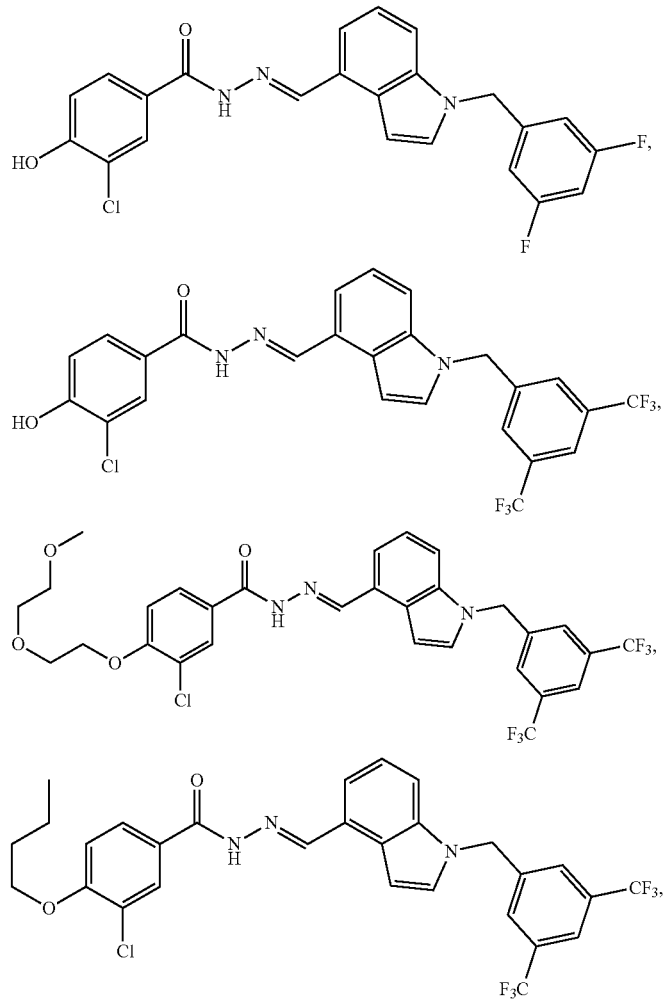

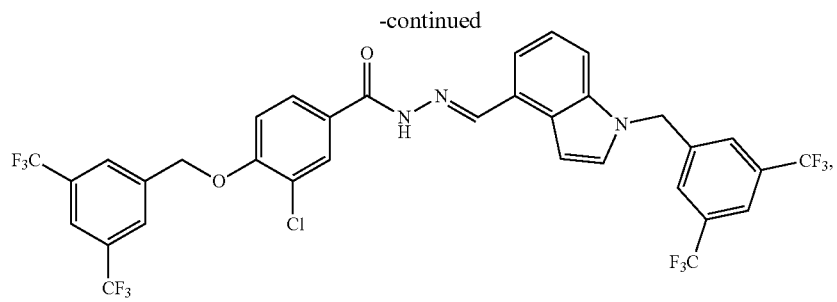

or a salt thereof.

In one aspect of the present invention, provided are compounds of Formula (IV):

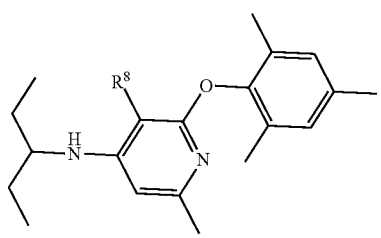

or a pharmaceutically acceptable salt, solvate, hydrate, polymorph, co-crystal, tautomer, isotopologue, stereoisomer, or prodrug thereof, wherein:

$R^8$ is —C(=O)$OR^d$, —C(=O)N($R^d$)$_2$ wherein each $R^d$ is independently H, or optionally substituted $C_{1-6}$ alkyl.

Formula (IV) contains the substituent $R^8$. In certain embodiments, $R^8$ is —C(=O)$OR^d$, —C(=O)N($R^d$)2 wherein each $R^d$ is independently H, or optionally substituted $C_{1-6}$ alkyl. In certain embodiments, $R^8$ is $CO_2Et$.

In certain embodiments, Formula (IV) is of the formula:

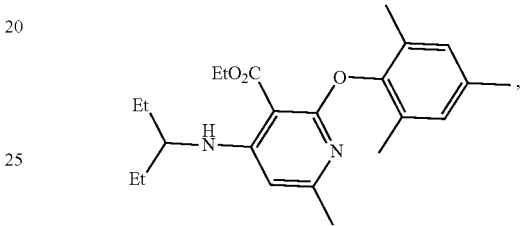

or a salt thereof.

In certain embodiments, a compound described herein is any of the compounds I-1 to I-17, found in Table 1, or a pharmaceutically acceptable salt, solvate, hydrate, polymorph, co-crystal, tautomer, stereoisomer, isotopologue, or prodrug thereof. In certain embodiments, a compound described herein is any of the compounds I-1 to I-17, or a pharmaceutically acceptable salt thereof.

TABLE 1

Compounds I-1 to I-17 of the disclosure

| Compound Number: | Structure: |
|---|---|
| I-1 |  |
| I-2 |  |

TABLE 1-continued
Compounds I-1 to I-17 of the disclosure
| Compound Number: | Structure: |
|---|---|
| I-3 | 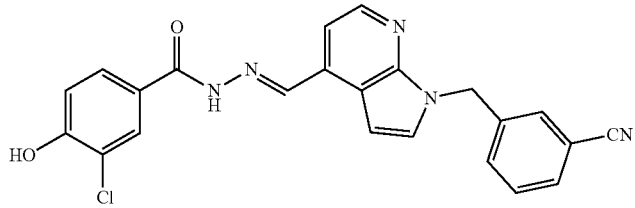 |
| I-4 | 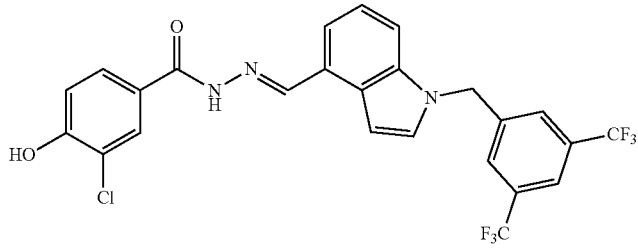 [SMILES: O=C(N/N=C/c1cccc2c1ccn2Cc1cc(C(F)(F)F)cc(C(F)(F)F)c1)c1ccc(O)c(Cl)c1] |
| I-5 | 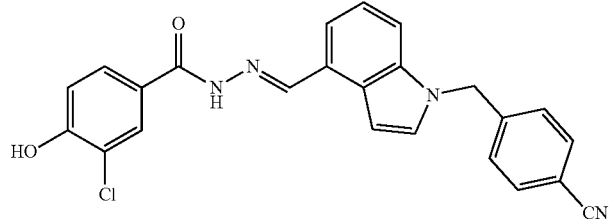 [SMILES: N#Cc1ccc(Cn2ccc3c(/C=N/NC(=O)c4ccc(O)c(Cl)c4)cccc32)cc1] |
| I-6 | 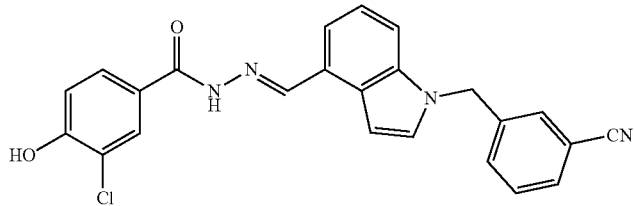 [SMILES: N#Cc1cccc(Cn2ccc3c(/C=N/NC(=O)c4ccc(O)c(Cl)c4)cccc32)c1] |
| I-7 | 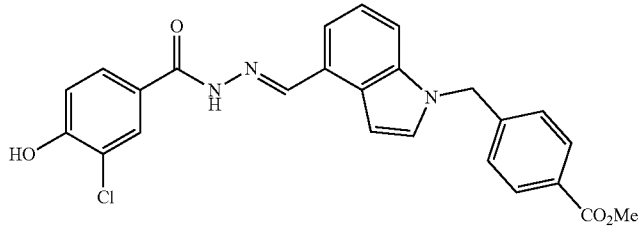 [SMILES: COC(=O)c1ccc(Cn2ccc3c(/C=N/NC(=O)c4ccc(O)c(Cl)c4)cccc32)cc1] |
| I-8 | 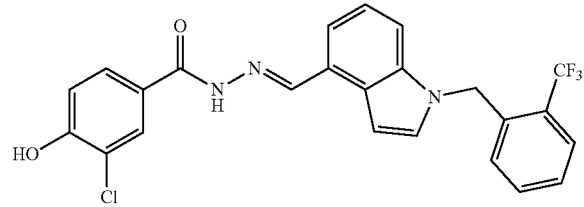 [SMILES: O=C(N/N=C/c1cccc2c1ccn2Cc1ccccc1C(F)(F)F)c1ccc(O)c(Cl)c1] |

TABLE 1-continued

Compounds I-1 to I-17 of the disclosure

| Compound Number: | Structure: |
|---|---|
| I-9 | |
| I-10 | |
| I-11 | |
| I-12 | |
| I-13 | |

TABLE 1-continued

Compounds I-1 to I-17 of the disclosure

| Compound Number: | Structure: |
|---|---|
| I-14 | 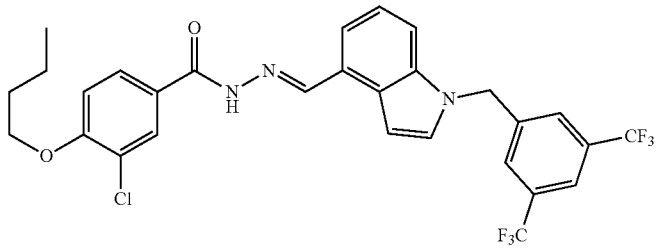 [SMILES: CCCCOc1ccc(C(=O)N/N=C/c2cccc3c2ccn3Cc2cc(C(F)(F)F)cc(C(F)(F)F)c2)cc1Cl] |
| I-15 | 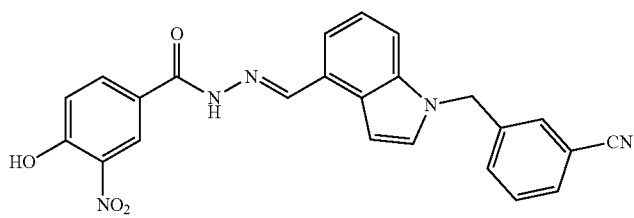 [SMILES: N#Cc1cccc(Cn2ccc3c(/C=N/NC(=O)c4ccc(O)c([N+](=O)[O-])c4)cccc32)c1] |
| I-16 | 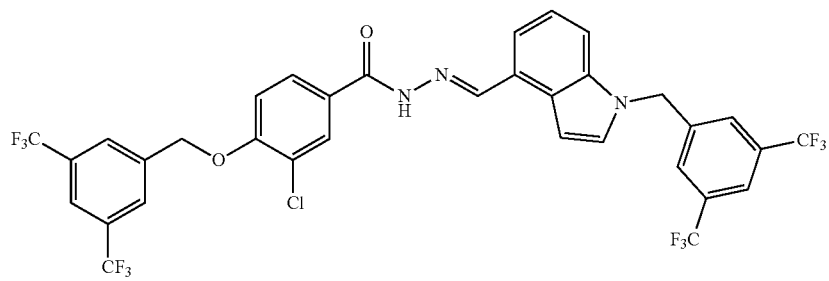 [SMILES: O=C(N/N=C/c1cccc2c1ccn2Cc1cc(C(F)(F)F)cc(C(F)(F)F)c1)c1ccc(OCc2cc(C(F)(F)F)cc(C(F)(F)F)c2)c(Cl)c1] |
| I-17 | 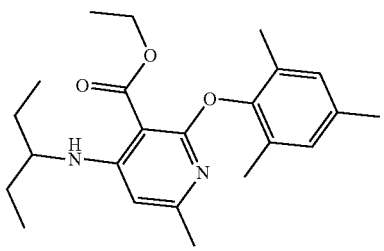 [SMILES: CCOC(=O)c1c(NC(CC)CC)cc(C)nc1Oc1c(C)cc(C)cc1C] |

Methods of Treatment and Uses

The compounds described herein may be useful in treating and/or preventing diseases or disorders including, but not limited to, addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)), stress-related disorders (e.g. chronic stress, PTSD, anxiety, or general anxiety disorders), eating disorders (e.g. orthorexia, or anorexia nervosa), or pain-related diseases or disorders (e.g. chronic pain, primary headache disorders, or migraines), or diseases and disorders associated with the activity of a PACAP receptor in a subject, or modulating the activity of a PACAP receptor in a subject, biological sample, tissue, or cell.

In one aspect, the invention provides a method of treating a subject suffering from or susceptible to a neurological disorder (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)), the method comprising administering to the subject in need thereof a therapeutically effective amount of any one of the compounds of Formula (I), Formula (II), or compounds I-18 to I-26 (see Table 2), or a pharmaceutically acceptable salt, solvate, hydrate, polymorph, co-crystal, tautomer, stereoisomer, isotopologue, or prodrug thereof. In certain aspects, the method treats addiction by preventing relapse of an addiction. In another aspect, the method treats addiction by lowering the incidence of relapse, as compared to a control population not receiving treatment via the method. In certain aspects, the method treats addiction by preventing stress-induced relapse of an addiction.

TABLE 2
Compounds I-18 to I-26
| Compound Number: | Structure: |
|---|---|
| I-18 | 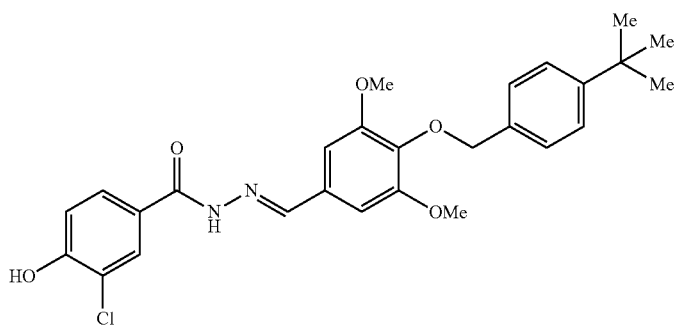 [SMILES: COc1cc(/C=N/NC(=O)c2ccc(O)c(Cl)c2)cc(OC)c1OCc1ccc(C(C)(C)C)cc1] |
| I-19 | 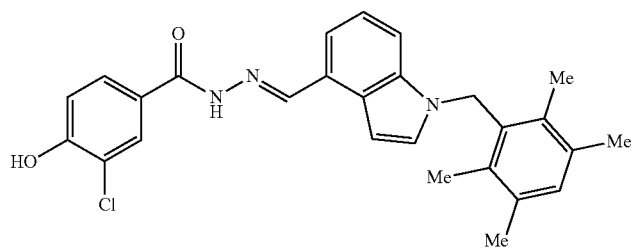 [SMILES: Cc1cc(C)c(C)c(Cn2ccc3c(/C=N/NC(=O)c4ccc(O)c(Cl)c4)cccc32)c1C] |
| I-20 | 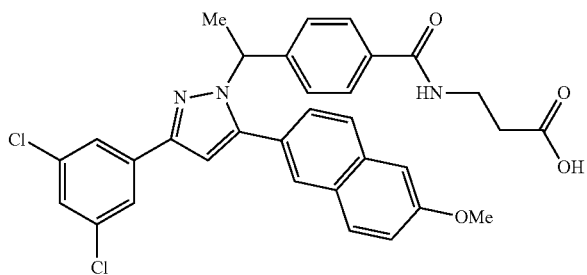 [SMILES: COc1ccc2cc(-c3cc(-c4cc(Cl)cc(Cl)c4)nn3C(C)c3ccc(C(=O)NCCC(=O)O)cc3)ccc2c1] |
| I-21 | 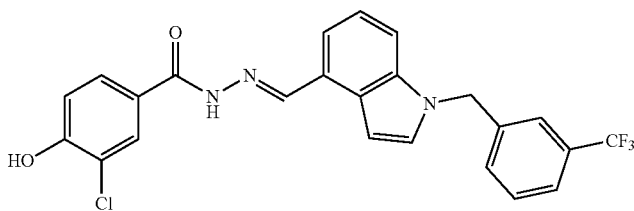 [SMILES: O=C(N/N=C/c1cccc2c1ccn2Cc1cccc(C(F)(F)F)c1)c1ccc(O)c(Cl)c1] |
| I-22 | 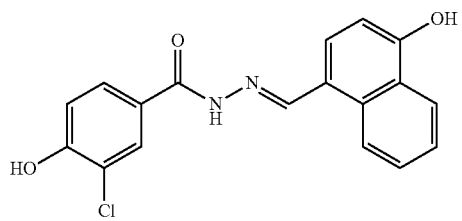 [SMILES: O=C(N/N=C/c1ccc(O)c2ccccc12)c1ccc(O)c(Cl)c1] |

TABLE 2-continued

Compounds I-18 to I-26

| Compound Number: | Structure: |
|---|---|
| I-23 | |
| I-24 | |
| I-25 | |
| I-26 | |

In one aspect, the method comprises administering to a subject a therapeutically effective amount of compound I-1, or a salt thereof. In one aspect, the method comprises administering to a subject a therapeutically effective amount of compound I-2, or a salt thereof. In one aspect, the method comprises administering to a subject a therapeutically effective amount of compound I-3, or a salt thereof. In one aspect, the method comprises administering to a subject a therapeutically effective amount of compound I-4, or a salt thereof. In one aspect, the method comprises administering to a subject a therapeutically effective amount of compound I-5, or a salt thereof. In one aspect, the method comprises administering to a subject a therapeutically effective amount of compound I-6, or a salt thereof. In one aspect, the method comprises administering to a subject a therapeutically effective amount of compound I-7, or a salt thereof. In one aspect, the method comprises administering to a subject a therapeutically effective amount of compound I-8, or a salt thereof. In one aspect, the method comprises administering to a subject a therapeutically effective amount of compound I-9, or a salt thereof. In one aspect, the method comprises administering to a subject a therapeutically effective amount of compound I-10, or a salt thereof. In one aspect, the method comprises administering to a subject a therapeutically effective amount of compound I-11, or a salt thereof. In one aspect, the method comprises administering to a subject a therapeutically effective amount of compound I-12, or a salt thereof. In one aspect, the method comprises administering to a subject a therapeutically effective amount of compound I-13, or a salt thereof. In one aspect, the method comprises administering to a subject a therapeutically effective amount of compound I-14, or a salt thereof. In one aspect, the method comprises administering to a subject a therapeutically effective amount of compound I-15, or a salt thereof. In one aspect, the method comprises administering to a subject a therapeutically effective amount of compound I-16, or a salt thereof. In one aspect, the method comprises administering to a subject a therapeutically effective amount of compound I-17, or a salt thereof. In one aspect, the method comprises administering to a subject a therapeutically effective amount of compound I-18, or a salt thereof. In one aspect, the method comprises administering to a subject a therapeutically effective amount of compound I-19, or a salt thereof. In one aspect, the method comprises administering to a subject a therapeutically effective amount of compound I-20, or a salt thereof. In one aspect, the method comprises administering to a subject a therapeutically effective amount of compound I-21, or a salt thereof. In one aspect, the method comprises administering to a subject a therapeutically effective amount of compound I-22, or a salt thereof. In one aspect, the method comprises administering to a subject a therapeutically effective amount of compound I-23, or a salt thereof. In one aspect, the method comprises administering to a subject a therapeutically effective amount of compound I-24, or a salt thereof. In one aspect, the method comprises administering to a subject a therapeutically effective amount of compound I-25, or a salt thereof. In one aspect, the method comprises administering to a subject a therapeutically effective amount of compound I-26, or a salt thereof.

In another aspect, the method comprises administering to a subject a therapeutically effective amount of a combination of any one of the compounds of Formula (I), Formula (II), or compounds I-18 to I-26, or salts thereof. In one aspect, the method comprises administering to a subject a therapeutically effective amount of compound I-20 with one or more other compounds of Formula (I), Formula (II), or compounds I-18 to I-26. In one aspect, the method comprises administering to a subject a therapeutically effective amount of compounds I-20 and I-1, or salts thereof. In another aspect, the neurological disorder is a stress-related disorder (e.g. chronic stress, post-traumatic stress disorder (PTSD), anxiety, or general anxiety disorder). In another aspect, the neurological disorder is an eating disorder (e.g. orthorexia, or anorexia nervosa). In another aspect, the neurological disorder is a pain-related disorder (e.g. chronic pain, primary headache disorder, or migraine). In another aspect, the neurological disorder is a panic disorder (e.g., panic attacks). In another aspect, the neurological disorder is addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)).

In another aspect, the invention provides a method of modulating the activity of a PACAP-receptor (e.g. PAC1) comprising administering an effective amount of any one of the compounds of Formula (I), Formula (II), or compounds I-18 to I-26, or a salt thereof. In another aspect, the modulation is inhibition. In another aspect, the modulation occurs in a biological sample (e.g. tissue or cell). In another aspect, the modulation occurs in a subject. In another aspect, PAC1 receptor antagonism can prevent relapse of an addiction. In certain aspects, PAC1 receptor antagonism can prevent stress-induced relapse of an addiction.

The invention provides a method of treating a subject suffering from or susceptible to a PACAP receptor-mediated disease or disorder, the method comprising administering to the subject in need thereof a therapeutically effective amount of any one of compounds of Formula (I), Formula (II), or compounds I-18 to I-26, or a salt thereof. In another aspect, the invention provides a method of treating a subject suffering from or susceptible to a PACAP receptor-mediated disease or disorder, the method comprising administering to the subject in need thereof a therapeutically effective amount of compound I-1, or a salt thereof. In another aspect, the PACAP receptor-mediated disorder is a neurological disorder. In another aspect, the PACAP receptor-mediated disease or disorder is a stress-related disorder (e.g. chronic stress, post-traumatic stress disorder (PTSD), anxiety, or general anxiety disorder). In another aspect, the PACAP receptor-mediated disease or disorder is a pain-related disorders (e.g. chronic pain, primary headache disorders, or migraines).

In certain embodiments, a compound of Formula (I), Formula (II), or compounds I-18 to I-26, is administered in combination with one or more additional pharmaceutical agents described herein. The additional pharmaceutical agent may also be a PACAP receptor antagonist. In certain embodiments, the additional pharmaceutical agent is an additional compound of Formula (I), Formula (II), or compounds I-18 to I-26, or a salt thereof. In certain embodiments, the additional pharmaceutical agent is an inhibitor of a kinase. In certain embodiments, the additional pharmaceutical agent is an inhibitor of MEK/ERK. In certain embodiments, the additional pharmaceutical agent is an anti-inflammatory agent, pain-relieving agent, antihistamine, beta-blocker, anxiolytic, anti-depressant, selective serotonin reuptake inhibitor (SSRI), serotonin and norepinephrine reuptake inhibitor (SNRI), sympatholytic, monoamine oxidase inhibitor (MAOI), opioid, carbamate, benzodiazepine, barbiturate, GABAergic drug, antipsychotic, or other agent.

The additional pharmaceutical agents include, but are not limited to, anti-anxiety agents, anti-inflammatory agents, antihistamines, anxiolytics, antidepressants, anti-allergic agents, pain-relieving agents, and any combination thereof. In certain embodiments, a pharmaceutical composition described herein further comprises a combination of the additional pharmaceutical agents described herein.

The inventive compounds or compositions may synergistically modulate a PACAP receptor induced by the additional pharmaceutical agent(s) in the biological sample or subject. Thus, the combination of the inventive compounds or compositions and the additional pharmaceutical agent(s) may be useful in treating neurological diseases resistant to a treatment using the additional pharmaceutical agent(s) without the inventive compounds or compositions.

In another aspect, the invention provides a kit for treating a neurological disease or disorder comprising a therapeutically effective amount of a compound of Formula (I), Formula (II), or compounds I-18 to I-26, or a salt thereof, and instructions for administration of the compound, or a salt thereof, to a subject. In another aspect, the neurological disease or disorder is a stress-related disorder (e.g. chronic stress, post-traumatic stress disorder (PTSD), anxiety, or general anxiety disorder), eating disorders (e.g. orthorexia, or anorexia nervosa), pain-related disorder (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)).

In another aspect, the invention provides a method of ameliorating a disorder or symptom thereof in a subject, the method comprising administering to the subject in need thereof a therapeutically effective amount of a compound of Formula (I), Formula (II), or compounds I-18 to I-26, or a salt thereof. In another aspect, the disease is a neurological disease or disorder.

Determination of a therapeutically effective amount or a prophylactically effective amount of the compound of the invention, can be readily made by the physician or veterinarian (the "attending clinician"), as one skilled in the art, by the use of known techniques and by observing results obtained under analogous circumstances. The dosages may be varied depending upon the requirements of the patient in the judgment of the attending clinician; the severity of the condition being treated and the particular compound being employed. In determining the therapeutically effective amount or dose, and the prophylactically effective amount or dose, a number of factors are considered by the attending clinician, including, but not limited to: the specific neurological disorder involved; pharmacodynamics characteristics of the particular agent and its mode and route of administration; the desired time course of treatment; the species of mammal; its size, age, and general health; the specific disease involved; the degree of or involvement or the severity of the disease; the response of the individual patient; the particular compound administered; the mode of administration; the bioavailability characteristics of the preparation administered; the dose regimen selected; the kind of concurrent treatment (i.e., the interaction of the compound of the invention with other co-administered therapeutics); and other relevant circumstances.

Treatment can be initiated with smaller dosages, which are less than the optimum dose of the compound. Thereafter, the dosage may be increased by small increments until the optimum effect under the circumstances is reached. For convenience, the total daily dosage may be divided and administered in portions during the day if desired. A therapeutically effective amount and a prophylactically effective amount of a compound of the invention is expected to vary from about 0.1 milligram per kilogram of body weight per day (mg/kg/day) to about 100 mg/kg/day.

Compounds determined to be effective for the prevention or treatment of neurological disorders in animals, e.g., dogs, chickens, and rodents, may also be useful in treatment of neurological disorders in humans. Those skilled in the art of treating neurological disorders in humans will know, based upon the data obtained in animal studies, the dosage and route of administration of the compound to humans. In general, the dosage and route of administration in humans is expected to be similar to that in animals.

The identification of those patients who are in need of prophylactic treatment for neurological disorders is well within the ability and knowledge of one skilled in the art. Certain of the methods for identification of patients which are at risk of developing neurological disorders which can be treated by the subject method are appreciated in the medical arts, such as family history, and the presence of risk factors associated with the development of that disease state in the subject patient. A clinician skilled in the art can readily identify such candidate patients, by the use of, for example, clinical tests, physical examination and medical/family history.

A method of assessing the efficacy of a treatment in a subject includes determining the pre-treatment extent of a neurological disorder by methods well known in the art and then administering a therapeutically effective amount of a compound of Formula (I), Formula (II), or compounds I-18 to I-26, according to the invention to the subject. After an appropriate period of time after the administration of the compound (e.g., 1 day, 1 week, 2 weeks, one month, six months), the extent of the neurological disorder is determined again. The modulation (e.g., decrease) of the extent of the neurological disorder indicates efficacy of the treatment. The extent of the neurological disorder may be determined periodically throughout treatment. For example, the extent of the neurological disorder may be checked every few hours, days or weeks to assess the further efficacy of the treatment. A decrease in extent of the neurological disorder indicates that the treatment is efficacious. The method described may be used to screen or select patients that may benefit from treatment with a PACAP receptor antagonist for a neurological disorder.

As used herein, "obtaining a biological sample from a subject," includes obtaining a sample for use in the methods described herein. A biological sample is described above.

In another aspect, a compound of the invention or pharmaceutical composition thereof is packaged in a therapeutically effective amount with a pharmaceutically acceptable carrier or diluent. The composition may be formulated for treating a subject suffering from or susceptible to a neurological disorder, and packaged with instructions to treat a subject suffering from or susceptible to a neurological disorder.

In another aspect, methods of treating a neurological disorder in a subject include administering an effective amount of a compound of the invention to the subject. The administration may be by any route of administering known in the pharmaceutical arts. The subject may have a neurological disorder, may be at risk of developing a neurological disorder, or may need prophylactic treatment prior to anticipated or unanticipated exposure to conditions capable of increasing susceptibility to neurological disorder.

In one aspect, a method of monitoring the progress of a subject being treated includes determining the pre-treatment status of the neurological disorder, administering a therapeutically effective amount of compound of the invention to the subject, and determining the status of the neurological disorder after an initial period of treatment, wherein the modulation of the status indicates efficacy of the treatment.

The subject may be at risk of a neurological disorder, may be exhibiting symptoms of a neurological disorder, may be susceptible to a neurological disorder and/or may have been diagnosed with a neurological disorder (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)).

The initial period of treatment may be the time in which it takes to establish a stable and/or therapeutically effective blood serum level of any of the compounds, compound combinations, dosing regimens, or pharmaceutical compositions delineated herein, or the time in which it take for the subject to clear a substantial portion of the compound, or any period of time selected by the subject or healthcare professional that is relevant to the treatment.

If the modulation of the status indicates that the subject may have a favorable clinical response to the treatment, the subject may be treated with the compound. For example, the subject can be administered a therapeutically effective dose or doses of the compound.

In another aspect, the invention provides antagonists for PACAP-receptors (e.g. PAC1) and methods for their use in a biological sample (e.g. tissue or cell). The methods include contacting the biological sample (e.g. tissue or cell) with an effective amount of any of the compounds of Formula (I), Formula (II), or compounds I-18 to I-26, compound combinations, dosing regimens, or pharmaceutical compositions delineated herein, such that the signaling of the PACAP-receptor is reduced. The contacting may be in vitro, e.g., by addition of the compound to a fluid surrounding the cells, for example, to the growth media in which the cells are living or existing. The contacting may also be by directly contacting the compound to the cells. Alternately, the contacting may be in vivo, e.g., by passage of the compound through a subject; for example, after administration, depending on the route of administration, the compound may travel through the digestive tract or the blood stream or may be applied or administered directly to cells in need of treatment.

The PACAP-receptor may be within a cell, isolated from a cell, recombinantly expressed, purified or isolated from a cell or recombinant expression system or partially purified or isolated from a cell or recombinant expression system.

The contacting may be in vitro, e.g., by addition of the compound to a solution containing purified PACAP-receptor, or, if the PACAP-receptor is present in cells, by adding the compound to a fluid surrounding the cells, for example, to the growth media in which the cells are living or existing. The contacting may also be by directly contacting the compound to the cells. Alternately, the contacting may be in vivo, e.g., by passage of the compound through a subject; for example, after administration, depending on the route of administration, the compound may travel through the digestive tract or the blood stream or may be applied or administered directly to cells in need of treatment.

Kits of the invention include kits for treating a neurological disorder in a subject. The invention also includes kits for regulation of PACAP-receptor function, assessing the efficacy of a treatment for a neurological disorder in a subject, monitoring the progress of a subject being treated for a neurological disorder, selecting a subject with a neurological disorder for treatment according to the invention, and/or treating a subject suffering from or susceptible to a neurological disorder. The kit may include any of the compounds, compound combinations, dosing regimens, or pharmaceutical compositions delineated herein and instructions for use. The instructions for use may include information on dosage, method of delivery, storage of the kit, etc. The kits may also include reagents, for example, test compounds, buffers, media (e.g., cell growth media), cells, etc. Test compounds may include known compounds or newly discovered compounds, for example, combinatorial libraries of compounds. One or more of the kits of the invention may be packaged together, for example, a kit for assessing the efficacy of a treatment for a neurological disorder may be packaged with a kit for monitoring the progress of a subject being treated for a neurological disorder according to the invention.

The present methods can be performed on cells in culture, e.g. in vitro or ex vivo, or on cells present in an animal subject, e.g., in vivo. Compounds of the inventions can be initially tested in vitro using primary cultures.

Alternatively, the effects of compound of the invention can be characterized in vivo using animals models. One skilled in the art, provided with the present disclosure, will readily understand that analogous screening methods for the same or a similar library of compounds could now be usefully applied to different neurological conditions in which the same or similar underlying pathologic mechanism is known or suspected to be a factor in the development or manifestation of the disease.

The recitation of a listing of chemical groups in any definition of a variable herein includes definitions of that variable as any single group or combination of listed groups. The recitation of an embodiment for a variable herein includes that embodiment as any single embodiment or in combination with any other embodiments or portions thereof. The recitation of an embodiment herein includes that embodiment as any single embodiment or in combination with any other embodiments or portions thereof.

The present disclosure provides methods of modulating (e.g., inhibiting or increasing) the activity (e.g., aberrant activity, or undesired activity, such as increased or decreased activity) of a PACAP-receptor. The present disclosure provides methods of modulating (e.g., inhibiting or increasing) the activity (e.g., aberrant activity, such as increased or decreased activity) of a PACAP-receptor in a subject. The present disclosure also provides methods for the treatment of a wide range of diseases, such as diseases associated with the aberrant activity (e.g., increased or decreased activity) of a PACAP-receptor, e.g., neurological diseases or disorders (e.g. stress-related disorders (e.g. chronic stress, post-traumatic stress disorder (PTSD), anxiety, or general anxiety disorder), eating disorders (e.g. orthorexia, or anorexia nervosa), pain-related disorders (e.g. chronic pain, primary headache disorders, or migraines), panic disorders, panic attacks, or addiction (e.g. addiction to a substance (e.g. addiction to cocaine, amphetamines, methamphetamine, methylphenidate, nicotine, alcohol, prescription medication, marijuana, tobacco, food, or an opioid selected from heroin, fentanyl, codeine, hydrocodone, morphine, oxycodone, hydromorphone, and methadone)).

EXAMPLES

In order that the present disclosure may be more fully understood, the following examples are set forth. The synthetic and biological examples described in this application are offered to illustrate the compounds, pharmaceutical compositions, and methods provided herein and are not to be construed in any way as limiting their scope.

Figure 2:
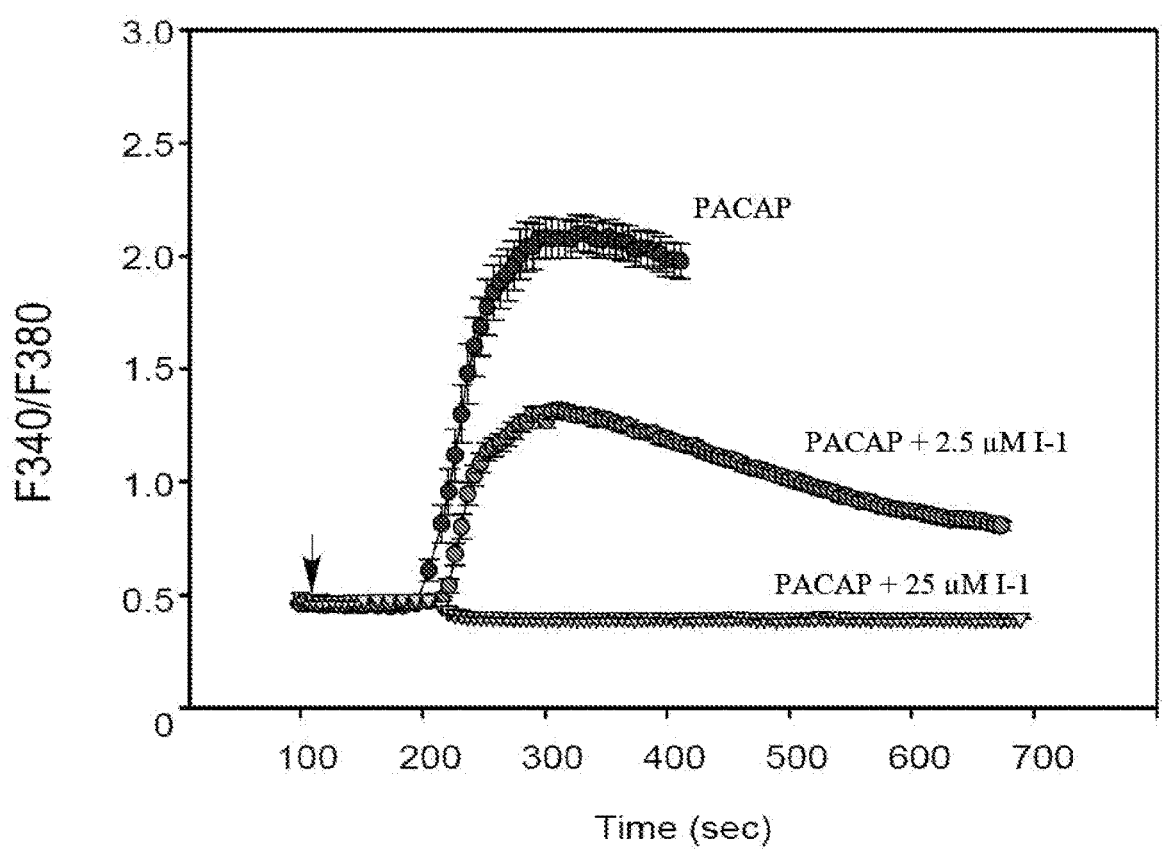
FIG. 2 depicts the F340/F380 kinetic ratio kinetic of the concentration of Ca2+ in HEK cells treated with PACAP or PACAP/compound I-1.

Example 1. Compound 1 Blocks Pac1 Receptor Internalization and Calcium Signaling Compound I-1 blocks PAC1 receptor internalization and calcium signaling. FIG. 1 shows that PAC1-EGFP receptor is preferentially expressed at the plasma membrane in a stable HEK cell line (Control). Upon 25 nM PACAP application (15 min), the tagged receptor is internalized into intracellular endosomes for ERK signaling (PACAP, middle panel). However, pretreatment of the culture (15 min) with 10-25 µM I-1 blocked PACAP-stimulated receptor internalization (PACAP+I-1); the PAC1-EGFP receptors remained on the cell surface. In FIG. 2, using the same HEK PAC1-EGFP cell line, PACAP rapidly stimulated calcium signaling in Fura-2 assays. The response was blocked approximately 50% with 2.5 µM compound I-1, and was abolished with 25 µM I-1.

Example 2. Compound 1 Blocks PAC1 Receptor-Mediated ERK Activation

Figure 3:
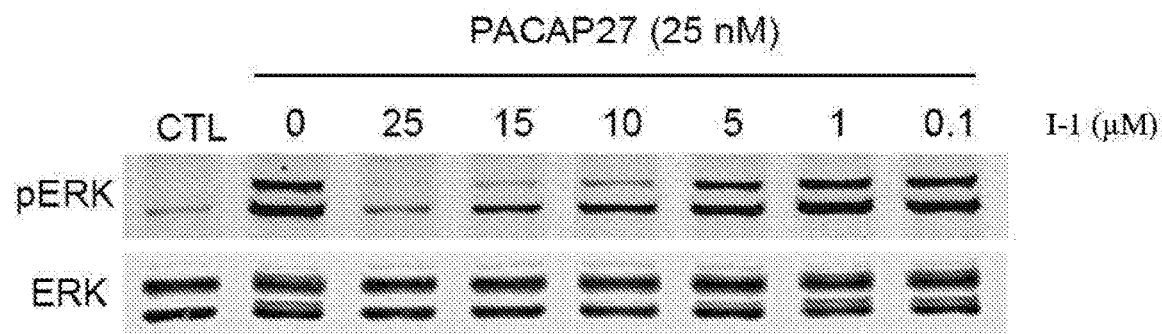
FIG. 3 depicts compound 1 blocks PAC1 receptor-mediated ERK activation in a dose-dependent manner using the HEK PAC1-EGFP receptor cell line.
Figure 4:
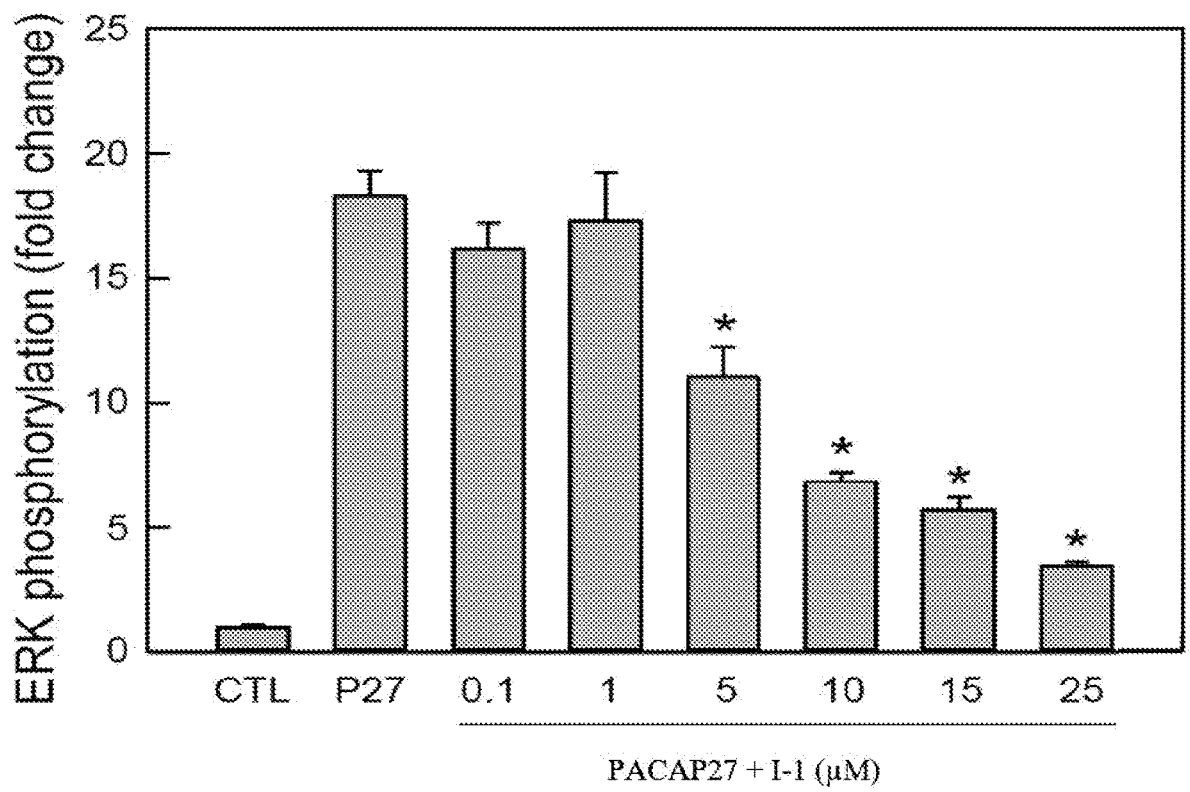
FIG. 4 depicts attenuated ERK activation using compound I-1.

In FIG. 3, using the stably expressing HEK PAC1-EGFP receptor cell line, compound I-1 blocks 25 nM PACAP-stimulated ERK phosphorylation and activation (p42 and p44 ERK bands) in a dose-dependent manner. Compound I-1 at a concentration of 25 µM can block 25 nM PACAP-stimulated ERK activation to near control levels. In FIG. 4, normalized to total ERK levels, I-1 demonstrates an approximate $IC_{50}$ of 8-10 µM in inhibiting PACAP-stimulated ERK activation. In similar assays, the other compounds (I-2 to I-26) can block PACAP-stimulated ERK signaling with an apparent IC$_{50}$ of 25 μM.

Figure 5:
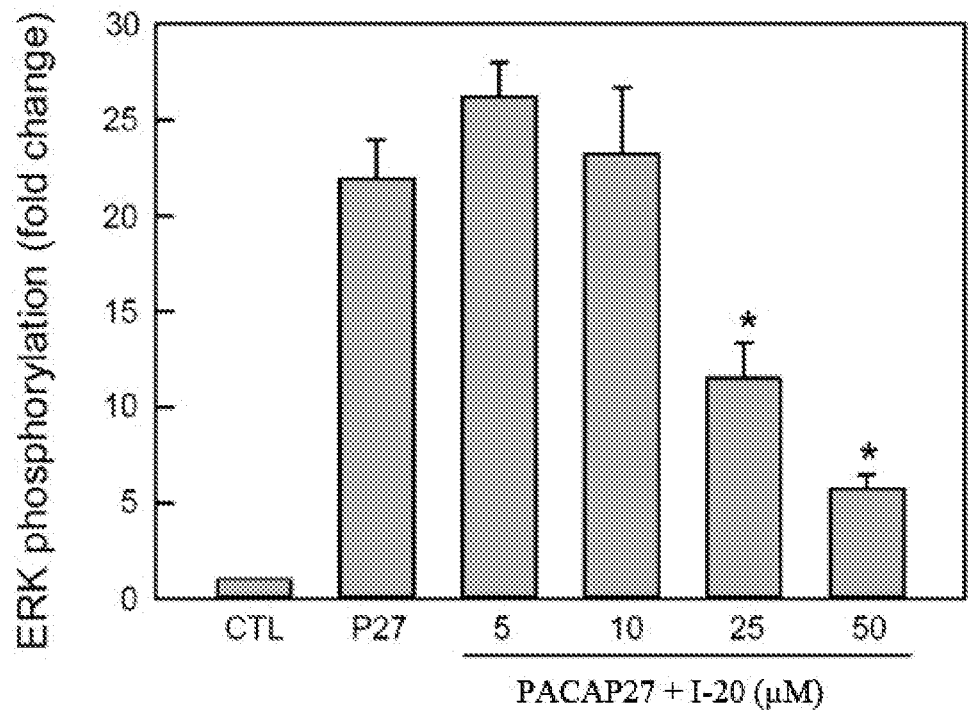
FIG. 5 depicts attenuated ERK activation using compound I-20.
Figure 6:
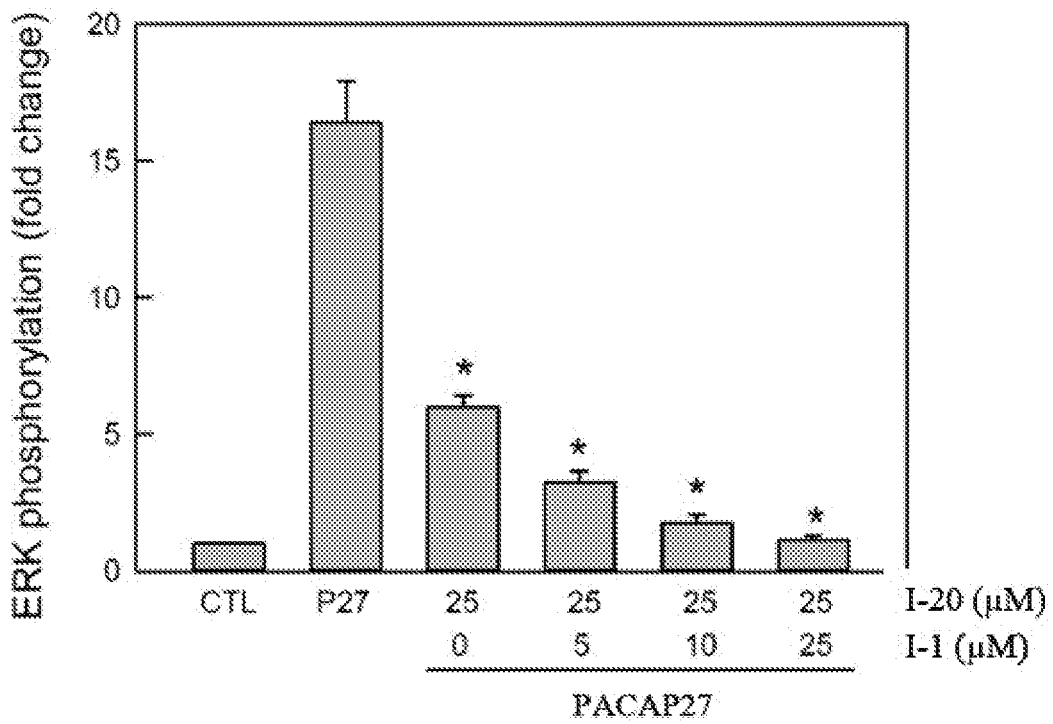
FIG. 6 depicts attenuated ERK activation using compounds I-1 and I-20.

Example 3. Compounds 1 and 10 can Work Synergistically in Blocking ERK Signaling In FIG. 5, the compound I-20 acts as a glucagon receptor (GCGR) antagonist by binding to an extra-helical allosteric site on the receptor. I-20 is a weak antagonist at the PAC1-receptor compared to I-1; ERK activation is attenuated approximately 50% with 25 μM I-20. In FIG. 6, the addition of compound I-20 can increase the efficacy and potency of compound I-20 in inhibiting PACAP-stimulated ERK activation. Compared to FIG. 2, compound I-20+10 μM I-1 can block ERK activation to basal or near-basal levels.

Figure 7:
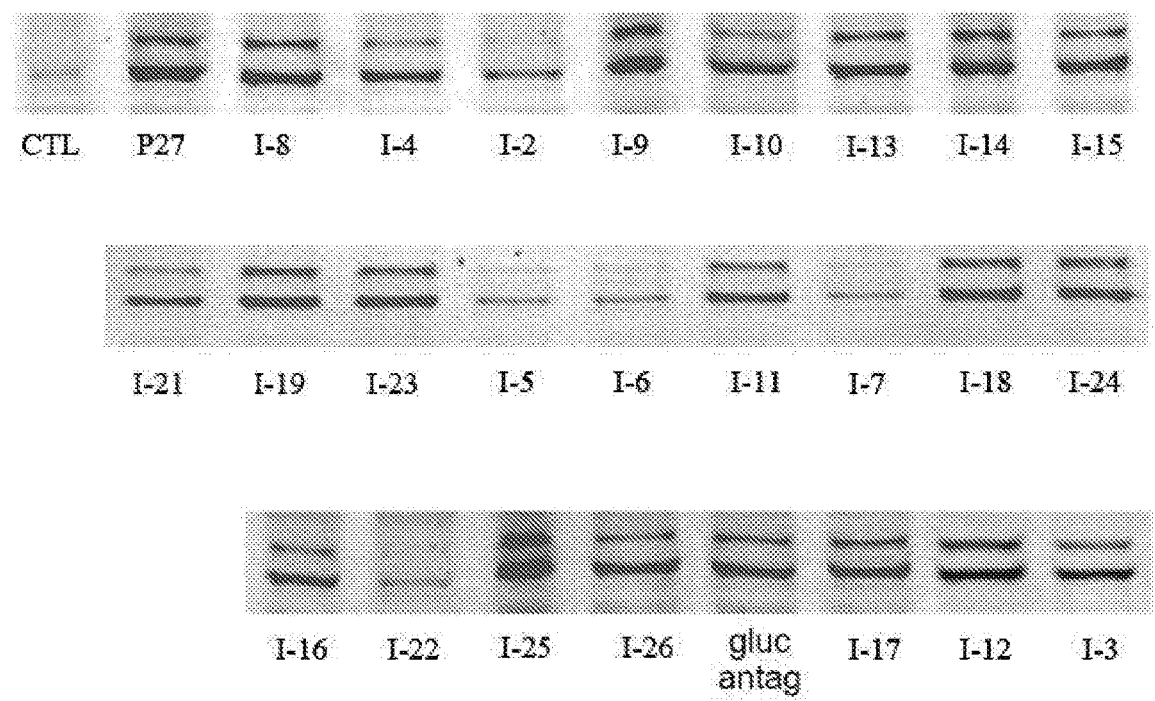
FIG. 7 depicts comparisons of different acyl hydrazides in blocking PACAP-stimulated ERK activation.

Example 4. Comparison of Different Compounds for PAC1 Receptor-Mediated ERK Activation In FIG. 7, all samples were pretreated with 25 μM acyl hydrazide before 25 nM PACAP application. Glucagon antagonist is I-20. Data normalized to total cellular ERK not shown.

Example 5. Compound 1 Blocks PACAP-Induced Anxiety-Related Behavior

Figure 8:
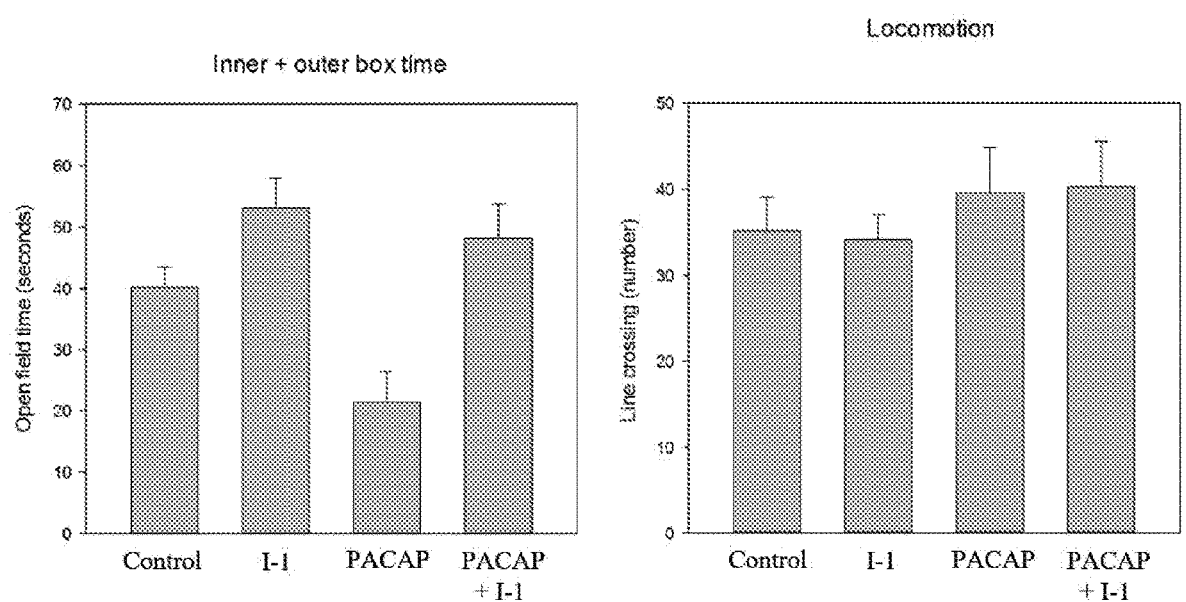
FIG. 8 depicts open field tests on male rats with BNST PACAP infusions, with or without compound I-1 pre-administration.
Figure 9:
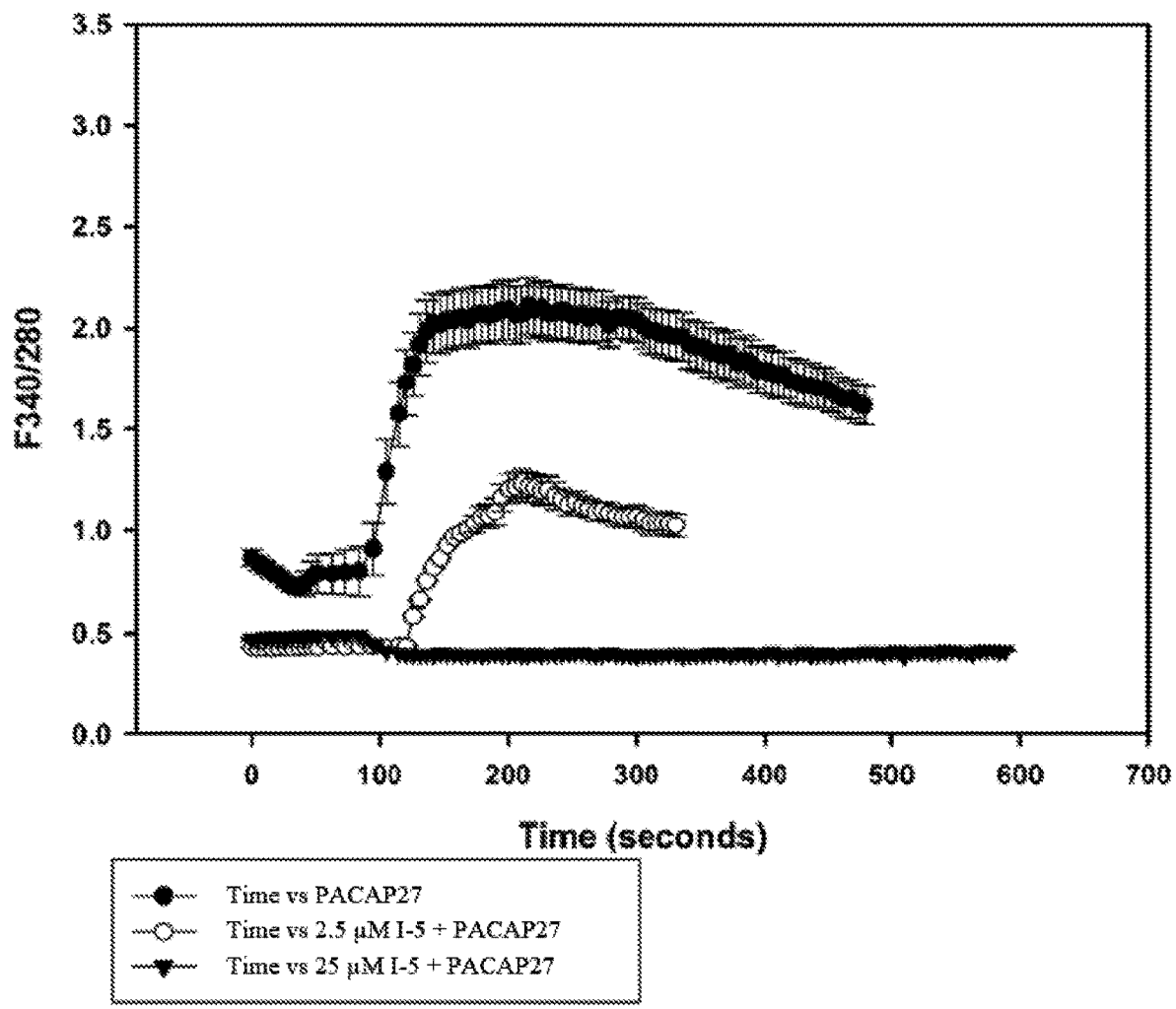
FIG. 9 depicts the effect of compound I-5 on PACAP-stimulated calcium signaling in the PAC1-EGFP HEK cell lines.
Figure 10:
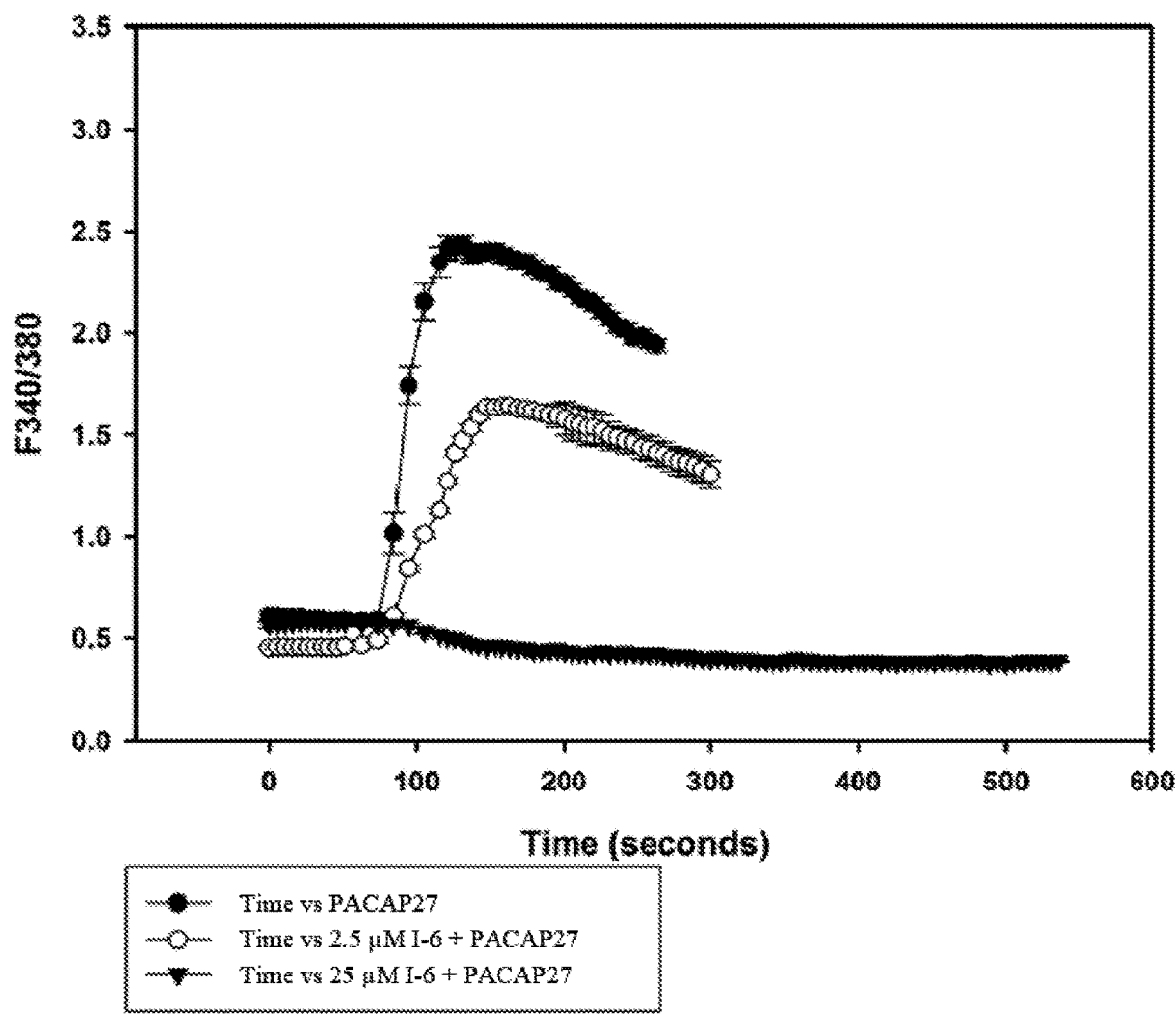
FIG. 10 depicts the effect of compound I-6 on PACAP-stimulated calcium signaling in the PAC1-EGFP HEK cell lines.
Figure 11:
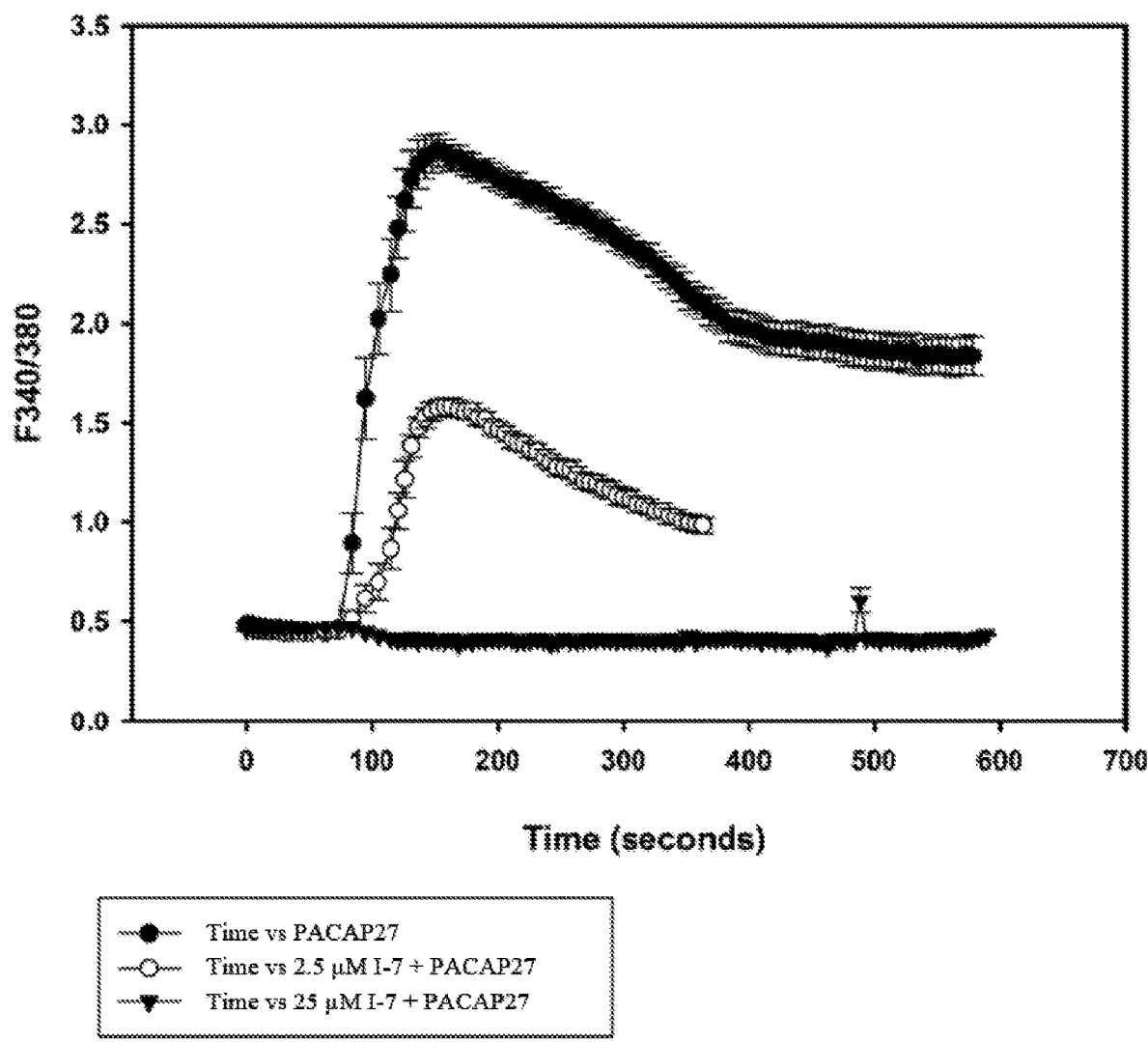
FIG. 11 depicts the effect of compound I-7 on PACAP-stimulated calcium signaling in the PAC1-EGFP HEK cell lines.
Figure 12:
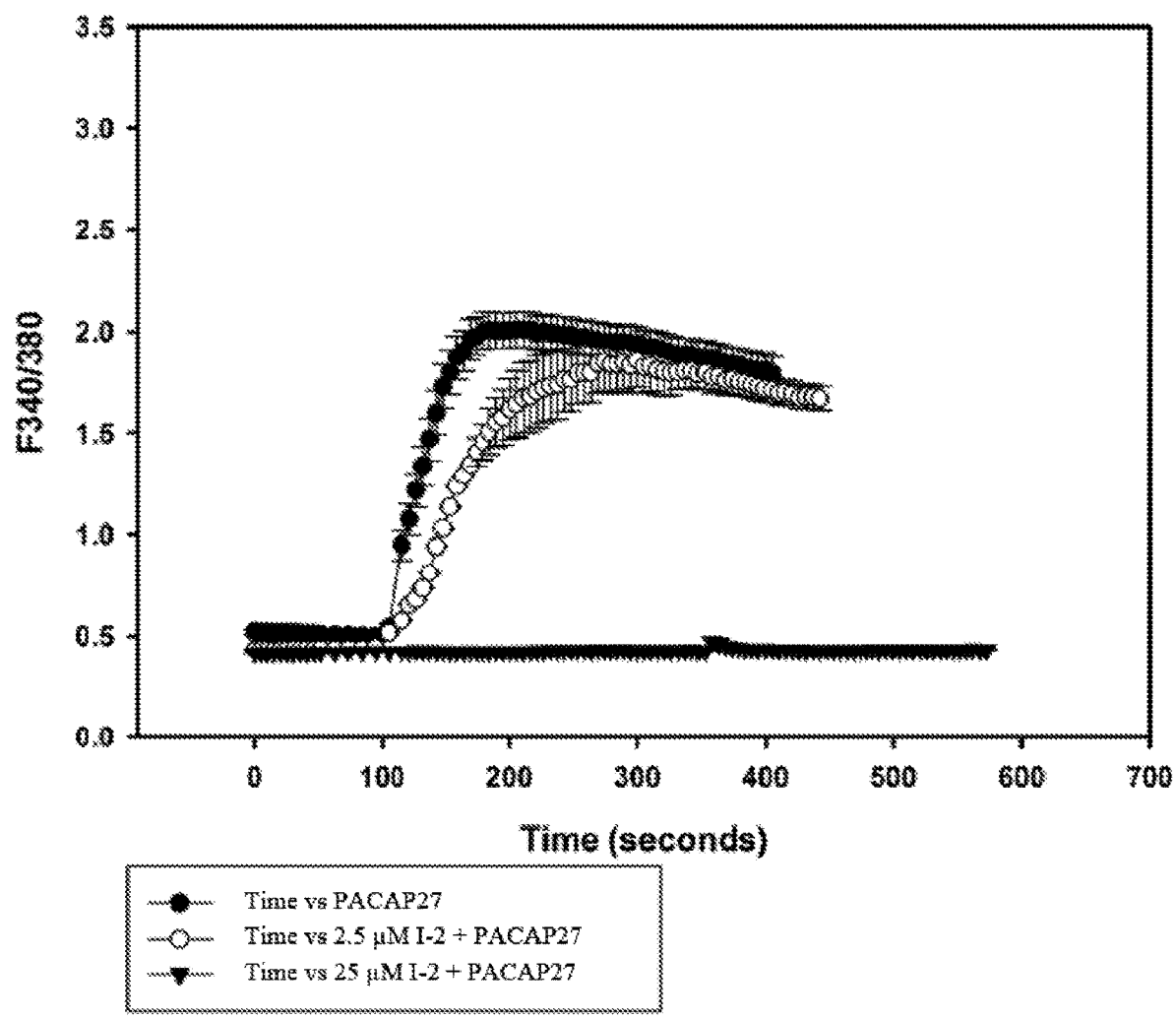
FIG. 12 depicts the effect of compound I-2 on PACAP-stimulated calcium signaling in the PAC1-EGFP HEK cell lines.
Figure 13:
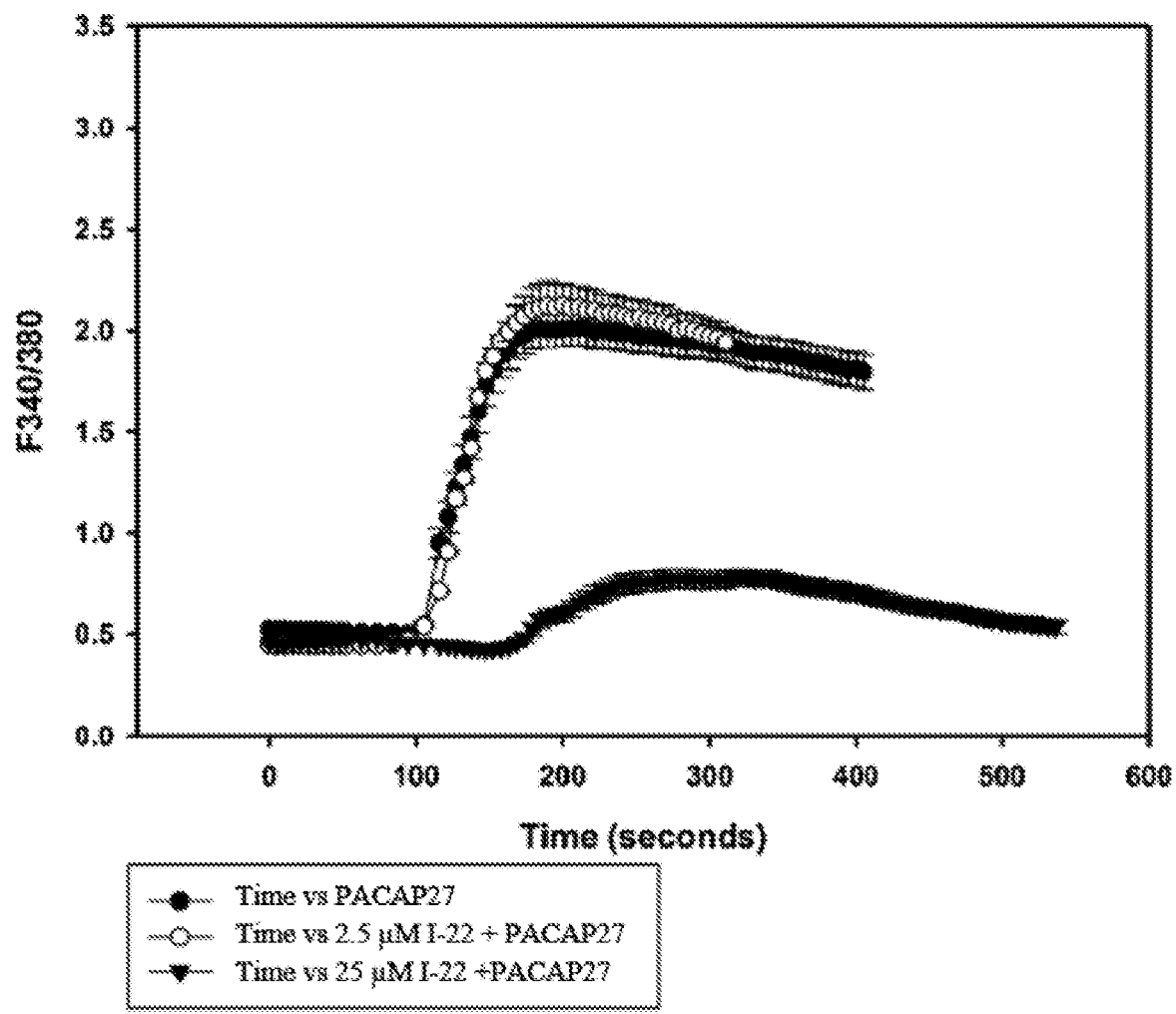
FIG. 13 depicts the effect of compound I-22 on PACAP-stimulated calcium signaling in the PAC1-EGFP HEK cell lines.
Figure 14:
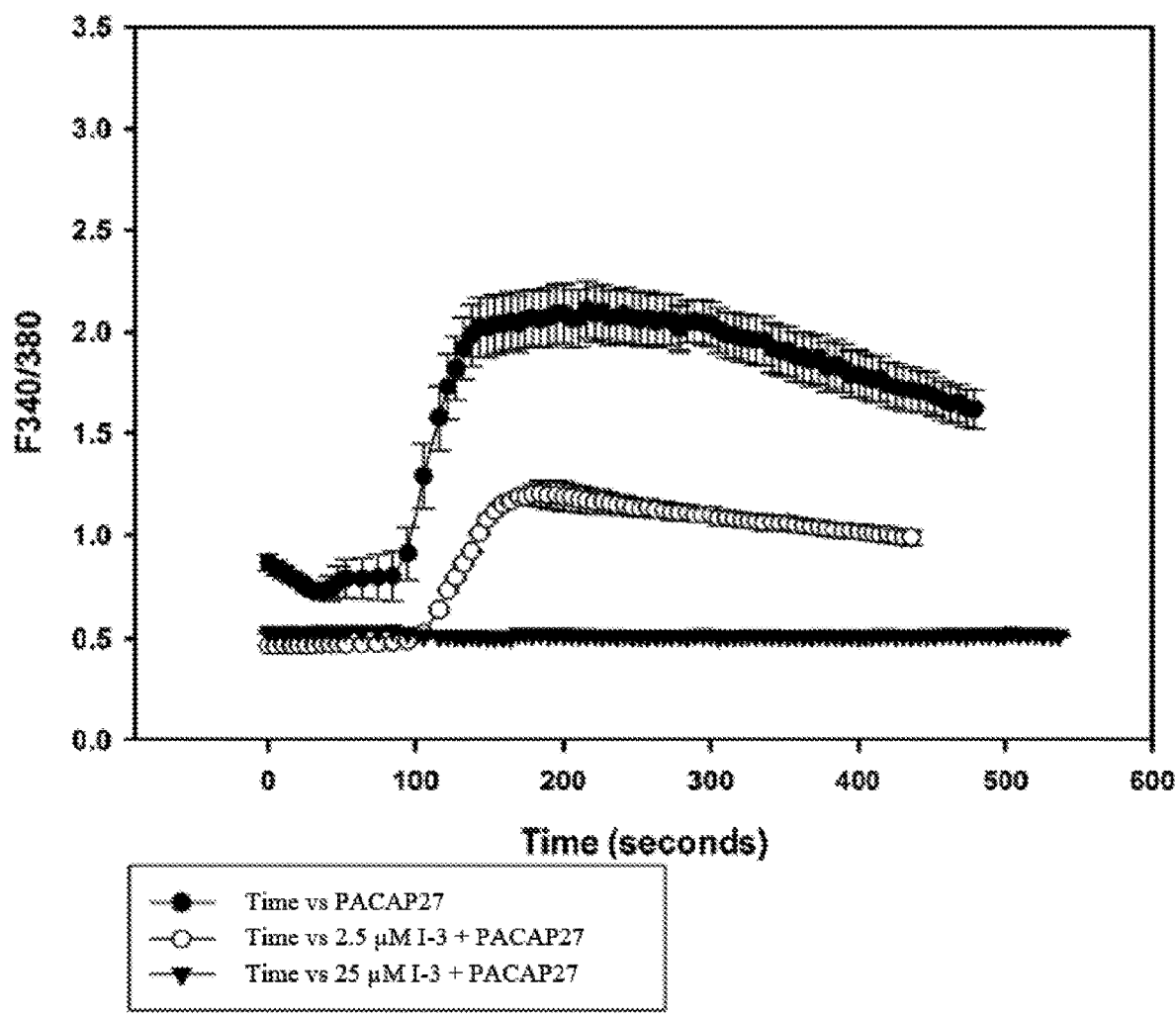
FIG. 14 depicts the effect of compound I-3 on PACAP-stimulated calcium signaling in the PAC1-EGFP HEK cell lines.
Figure 15:
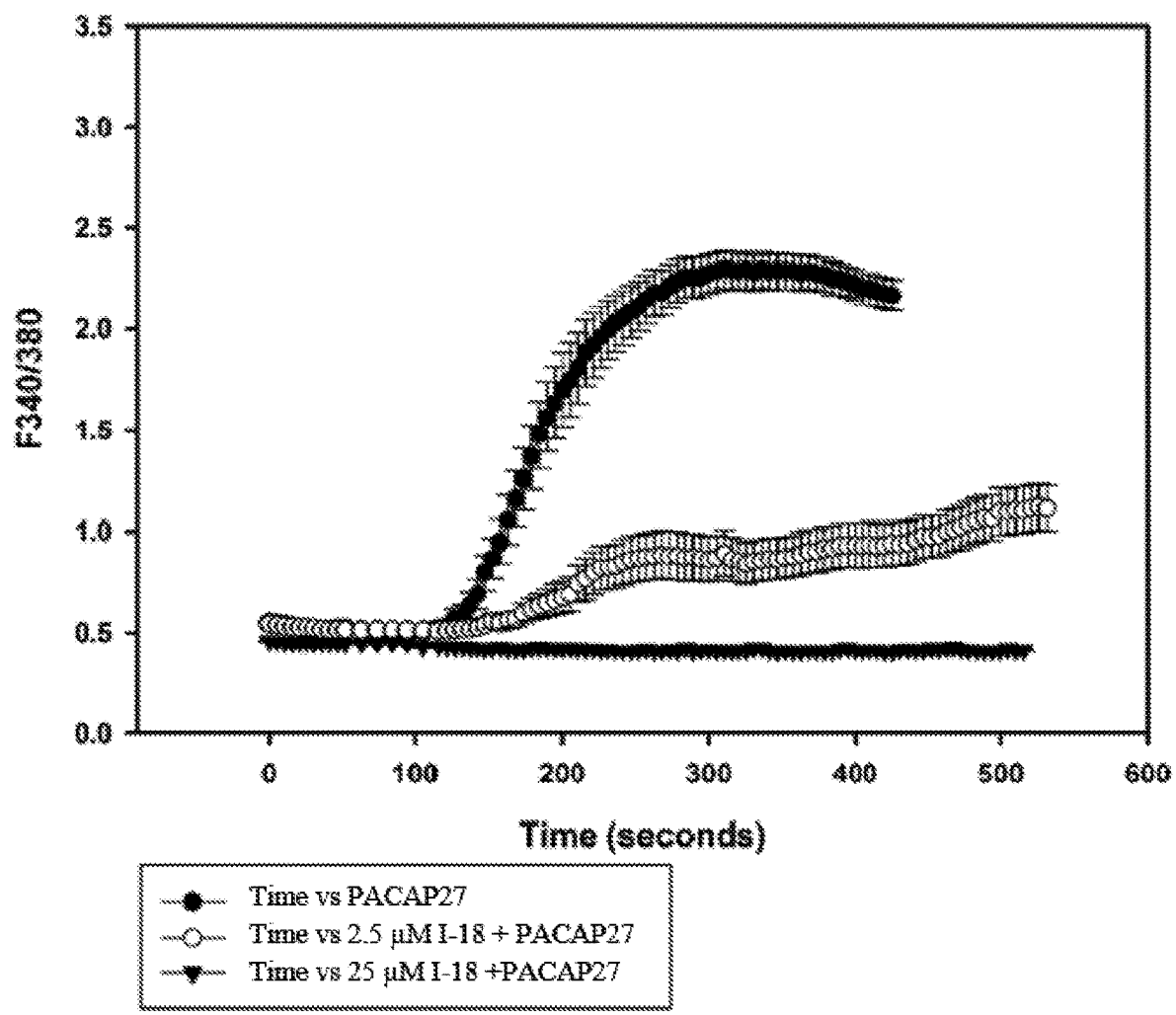
FIG. 15 depicts the effect of compound I-18 on PACAP-stimulated calcium signaling in the PAC1-EGFP HEK cell lines.
Figure 16:
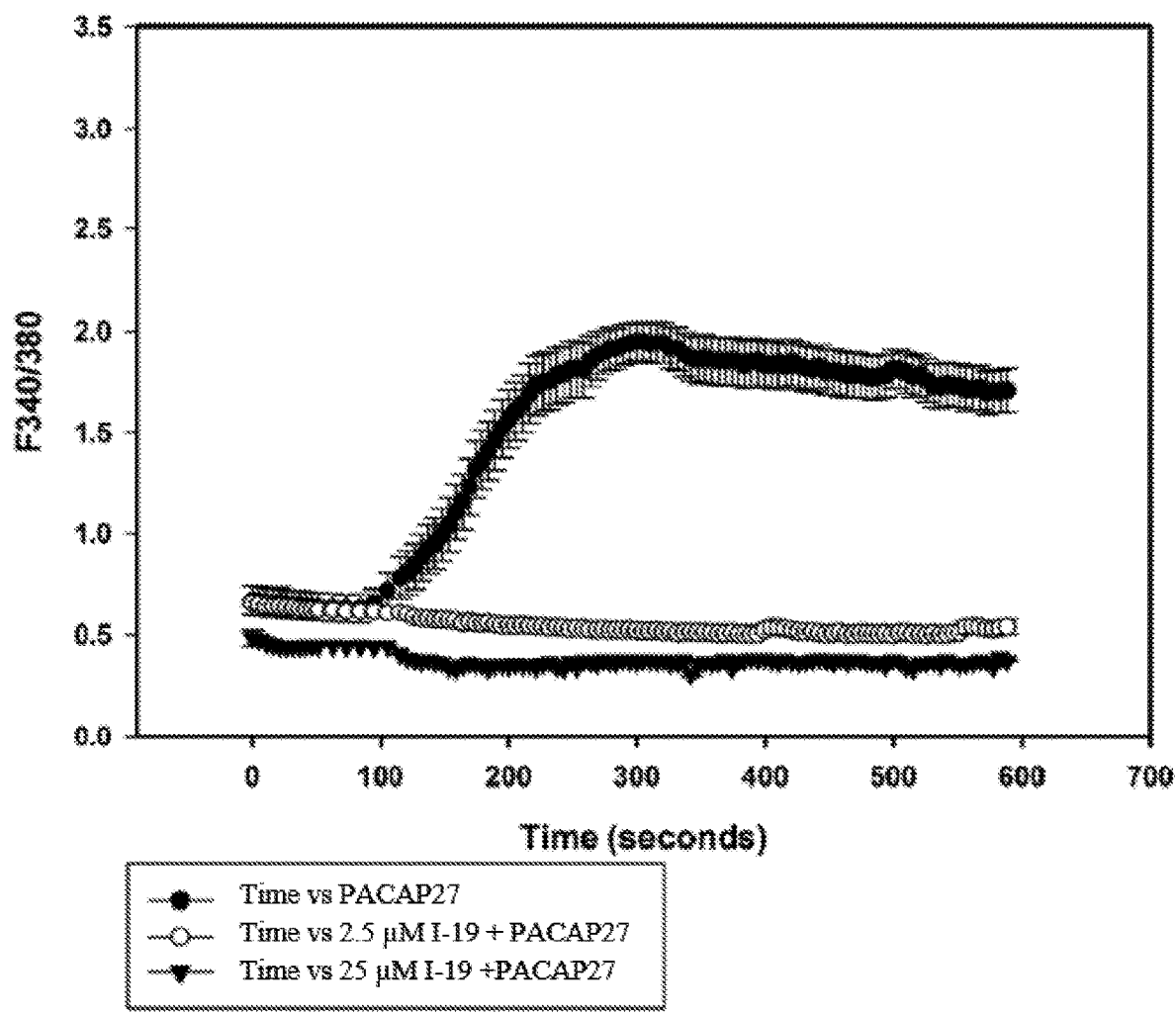
FIG. 16 depicts the effect of compound I-19 on PACAP-stimulated calcium signaling in the PAC1-EGFP HEK cell lines.
Figure 17:
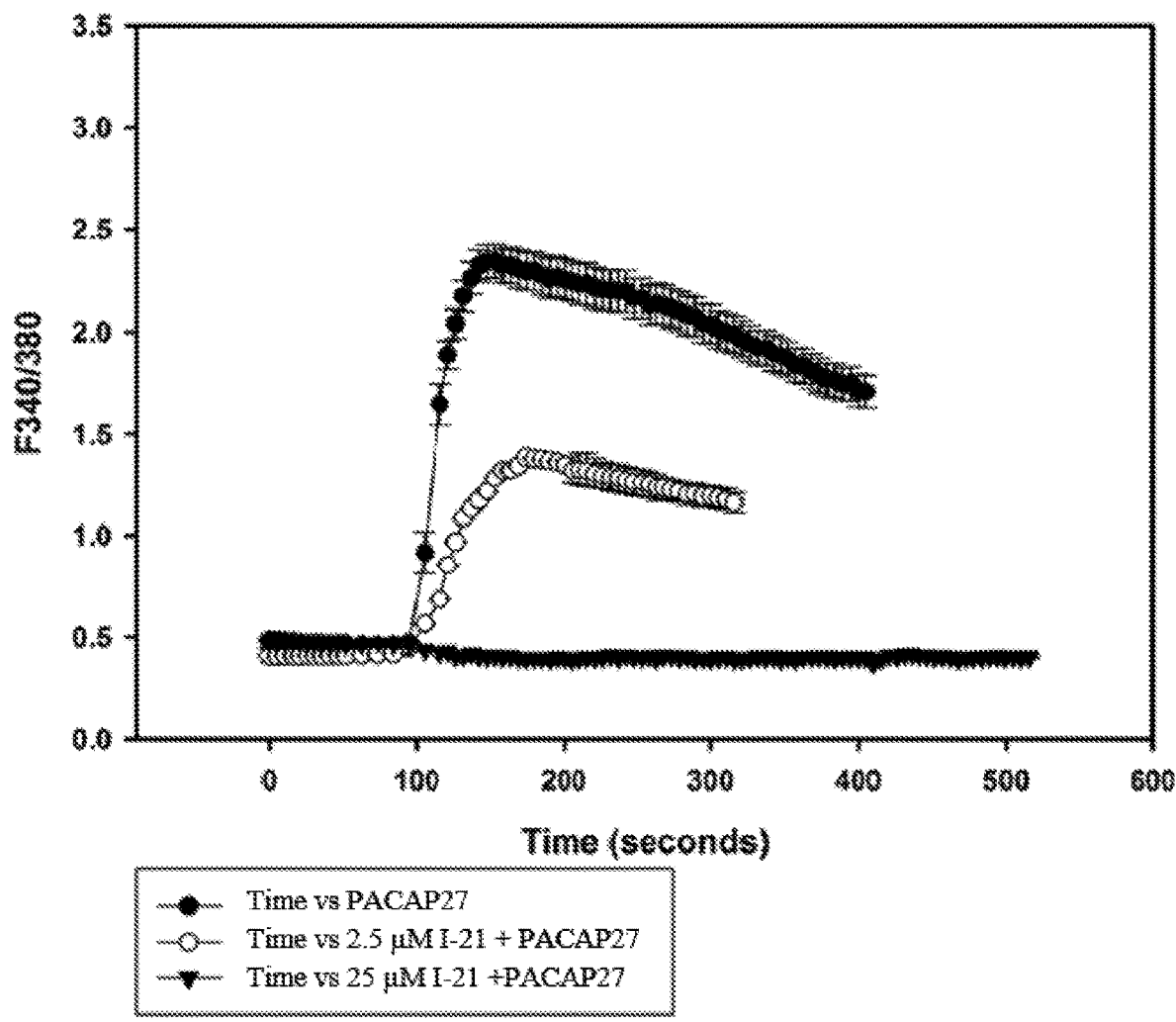
FIG. 17 depicts the effect of compound I-21 on PACAP-stimulated calcium signaling in the PAC1-EGFP HEK cell lines.

Compound I-1 blocks PACAP-induced anxiety-related behavior. In FIG. 8, male rats were cannulated bilaterally into the BNST. In the left panel, in open field tests, 5-10 μM I-1 infusions into the BNST had no apparent effects compared to control. PACAP infusions into the BNST produced stress/anxiety-like responses as reflected by decreased center field times (duration in seconds). However, BNST pre-injection with compound I-1 completely blocked the PACAP-induced stress/anxiety responses (I-1+PACAP). In the right panel, the open field entry data was not affected by changes in animal locomotion. Asterisk, statistically different from other groups. Note: I-1+PACAP returned open field times to untreated control levels.

Example 6. Compounds of Formula Blocks PACAP-Stimulated Calcium Signaling

FIG. 9-17 show the compounds of Formula (I), Formula (II), or compounds I-18 to I-26, demonstrate varying abilities to block PACAP-stimulated calcium signaling. The PAC1-EGFP HEK cell lines were preloaded with Fura-2 for calcium imaging. PACAP alone produced robust calcium signals. At 2.5 μM, most compounds were able to block the PACAP-induced calcium signal approximately 50%; 25 μM compounds blocked calcium flux completely.

Example 7. Characterization Data for Exemplary Compounds (E)-3-chloro-N'-((1-(3,5-difluorobenzyl)-1H-indol-4-yl)methylene)-4-hydroxybenzohydrazide (I-1)

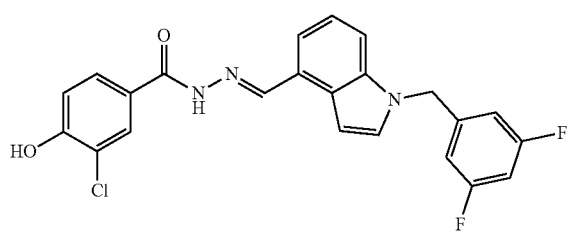 [SMILES: O=C(N/N=C/c1cccc2c1ccn2Cc1cc(F)cc(F)c1)c1ccc(O)c(Cl)c1]

$^1$H NMR (500 MHz, DMSO-d$_6$): δ 11.72 (s, 1H), 10.94 (s, 1H), 8.67 (s, 1H), 8.02 (d, J=2.15 Hz, 1H), 7.81 (d, J=8.78 Hz, 1H), 7.69 (d, J=2.54 Hz, 1H), 7.58 (d, J=8.0 Hz, 1H), 7.32 (d, J=7.45 Hz, 1H), 7.29 (d, J=2.17 Hz, 1H), 7.21 (t, J=7.57 Hz, 1H), 7.13, (tt, J=9.47, 2.04 Hz, 1H), 7.10 (d, J=8.45 Hz, 1H), 6.92-6.86 (m, 2H), 5.53 (s, 2H). HRMS (ESI) m/z: [M+H]$^+$ calcd for [C$_{23}$H$_{17}$ClF$_2$N$_3$O$_2$]$^+$: 440.0977, observed: 440.0973.

(E)-3-chloro-4-hydroxy-N'-((1-(3-nitrobenzyl)-1H-indol-4-yl)methylene)benzohydrazide (I-2)

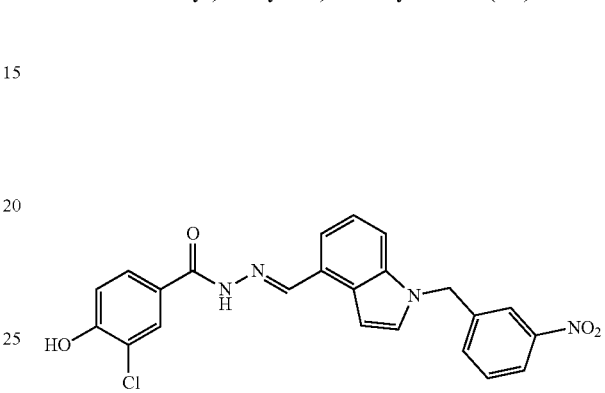

$^1$H NMR (500 MHz, DMSO-d$_6$): δ 11.71 (s, 1H), 10.94 (s, 1H), 8.67 (s, 1H), 8.14-8.10 (m, 1H), 8.07 (s, 1H), 8.00 (s, 1H), 7.80 (d, J=7.94 Hz, 1H), 7.72 (s, 1H), 7.64-7.58 (m, 3H), 7.33-7.27 (m, 2H), 7.20 (t, J=7.94 Hz, 1H) 7.08 (d, J=7.94 Hz, 1H), 5.67, (s, 2H). HRMS (ESI) m/z: [M+H]$^+$ calcd for [C$_{23}$H$_{18}$ClN$_4$O$_4$]$^+$: 449.1017, observed: 449.1026.

(E)-3-chloro-N'-((1-(3-cyanobenzyl)-1H-pyrrolo[2,3-b]pyridin-4-yl)methylene)-4-hydroxybenzohydrazide (I-3)

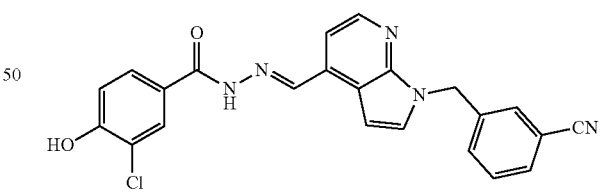

$^1$H NMR (500 MHz, DMSO-d$_6$): δ 11.99 (s, 1H), 11.01 (s, 1H), 8.67 (s, 1H), 8.35 (d, J=4.47 Hz, 1H), 8.01 (s, 1H), 7.85-7.70 (m, 4H), 7.55-7.50 (m, 2H), 7.35 (s, 1H), 7.13 (s, 1H), 7.10 (d, J=8.67 Hz, 1H), 5.59 (s, 2H).

$^1$H NMR (500 MHz, CD$_3$CN): δ: 10.43 (s, 1H), 8.56 (s, 1H), 8.36 (d, J=5.43 Hz, 1H), 7.99 (d, J=1.43 Hz, 1H), 7.78 (dd, J=8.53, 2.13 Hz, 1H), 7.64 (dt, J=7.63, 1.38 Hz, 1H), 7.61 (s, 1H), 7.55 (s, 1H), 7.53-7.46 (m, 2H), 7.33 (d, J=4.27 Hz, 1H), 7.18 (s, 1H), 7.10 (d, J=8.53 Hz, 1H), 5.59 (s, 2H). HRMS (ESI) m/z: [M+H]$^+$ calcd for [C$_{23}$H$_{17}$ClN$_5$O$_2$]$^+$: 430.1071, observed: 430.1077.

(E)-N'-((1-(3,5-bis(trifluoromethyl)benzyl)-1H-indol-4-yl)methylene)-3-chloro-4-hydroxybenzohydrazide (I-4)

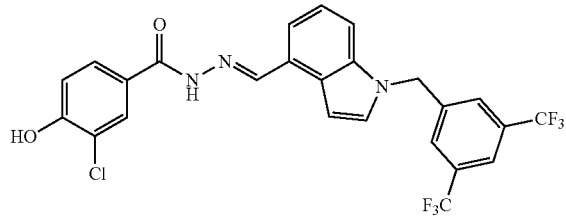 [SMILES: O=C(N/N=C/c1cccc2c1ccn2Cc1cc(C(F)(F)F)cc(C(F)(F)F)c1)c1ccc(O)c(Cl)c1]

$^1$H NMR (500 MHz, DMSO-d$_6$): δ 11.72 (s, 1H), 10.95 (s, 1H), 8.66 (s, 1H), 8.03 (s, 1H), 8.02-8.00 (m, 1H), 7.88 (s, 2H), 7.80 (d, J=8.5 Hz, 1H), 7.77 (s, 1H), 7.65 (d, J=8.5 Hz, 1H), 7.34-7.29 (m, 2H), 7.22 (t, J=7.8 Hz, 1H), 7.09 (d, J=7.8 Hz, 1H), 5.72 (s, 2H). HRMS (ESI) m/z: [M+H]$^+$ calcd for [C$_{25}$H$_{17}$ClF$_6$N$_3$O$_2$]$^+$: 540.0913, observed: 540.0928.

(E)-3-chloro-N'-((1-(4-cyanobenzyl)-1H-indol-4-yl)methylene)-4-hydroxybenzohydrazide (I-5)

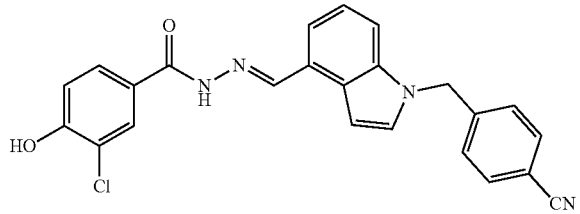 [SMILES: N#Cc1ccc(Cn2ccc3c(/C=N/NC(=O)c4ccc(O)c(Cl)c4)cccc32)cc1]

$^1$H NMR (500 MHz, DMSO-d$_6$): δ 11.70 (s, 1H), 10.95 (s, 1H), 8.65 (s, 1H), 8.00 (d, J=1.66 Hz, 1H), 7.79 (app d, J=8.5 Hz, 3H), 7.67 (s, 1H), 7.52 (d, J=8.5 Hz, 1H), 7.34-7.25 (m, 4H), 7.18 (t, J=7.39 Hz, 1H), 7.07 (d, J=8.31 Hz, 1H), 5.61 (s, 2H). HRMS (ESI) m/z: [M+H]$^+$ calcd for [C$_{24}$H$_{18}$ClN$_4$O$_2$]$^+$: 429.1118, observed: 429.1113.

(E)-3-chloro-N'-((1-(3-cyanobenzyl)-1H-indol-4-yl)methylene)-4-hydroxybenzohydrazide (I-6)

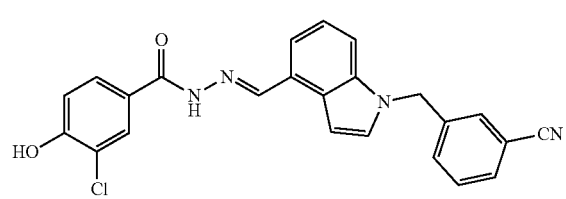 [SMILES: N#Cc1cccc(Cn2ccc3c(/C=N/NC(=O)c4ccc(O)c(Cl)c4)cccc32)c1]

$^1$H NMR (500 MHz, DMSO-d$_6$): δ 11.71 (s, 1H), 10.96 (s, 1H), 8.66 (s, 1H), 8.00 (d, J=2.02 Hz, 1H), 7.80 (d, J=7.69 Hz, 1H), 7.74 (d, J=7.55 Hz, 1H), 7.72-7.68 (m, 2H), 7.59 (d, J=8.12 Hz, 1H), 7.53, (t, J=7.69 Hz, 1H), 7.48 (d, J=8.12 Hz, 1H), 7.31 (d, J=7.27 Hz, 1H), 7.27 (s, 1H), 7.20 (t, J=7.27 Hz, 1H), 7.08 (d, J=8.55 Hz, 1H), 5.56 (s, 2H). HRMS (ESI) m/z: [M+H]$^+$ calcd for [C$_{24}$H$_{18}$ClN$_4$O$_2$]$^+$: 429.1113, observed: 429.1120.

methyl (E)-4-((4-((2-(3-chloro-4-hydroxybenzoyl)hydrazineylidene)methyl)-1H-indol-1-yl)methyl)benzoate (I-7)

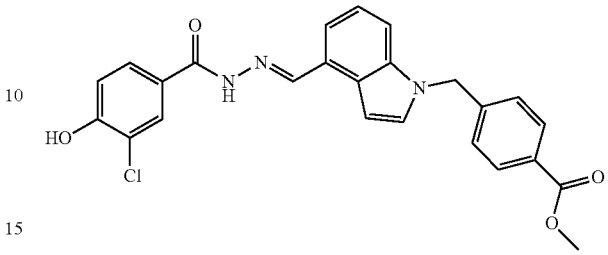

$^1$H NMR (500 MHz, DMSO-d$_6$): δ 11.70 (s, 1H), 10.96 (s, 1H), 8.67 (s, 1H), 8.00 (d, J=1.47 Hz, 1H), 7.90 (d, J=8.09 Hz, 1H), 7.80 (d, J=8.09 Hz, 1H), 7.67 (s, 1H), 7.52 (d, J=8.09 Hz, 1H), 7.33-7.24 (m, 4H), 7.18 (t, J=7.46 Hz, 1H), 7.08 (d, J=8.83 Hz, 1H), 5.60 (s, 2H), 3.82 (s, 3H). HRMS (ESI) m/z: [M+H]$^+$ calcd for [C$_{25}$H$_{21}$ClN$_3$O$_4$]$^+$: 462.1221, observed: 462.1221

(E)-N'-(4-((4-(tert-butyl)benzyl)oxy)-3,5-dimethoxybenzylidene)-3-chloro-4-hydroxybenzohydrazide (I-18)

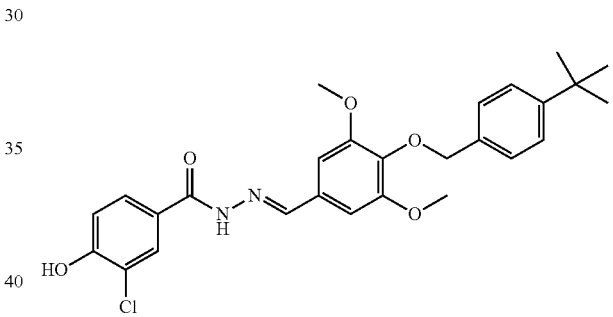

$^1$H NMR (500 MHz, DMSO-d$_6$): δ11.71 (s, 1H), 10.95 (s, 1H), 8.36 (s, 1H), 7.95 (s, 1H), 7.76 (dd, J=8.6, 2.1 Hz, 1H), 7.42-7.34 (m, 4H), 7.07 (d, J=8.6 Hz, 1H), 7.02 (s, 2H), 4.91 (s, 2H), 3.83 (s, 6H), 1.28 (s, 9H). HRMS (ESI) m/z: [M+H]$^+$ calcd for [C$_{27}$H$_{30}$ClN$_2$O$_5$]$^+$: 497.1843, observed: 497.1848.

(E)-3-chloro-4-hydroxy-N'-((1-(2,3,5,6-tetramethylbenzyl)-1H-indol-4-yl)methylene)benzohydrazide (I-19)

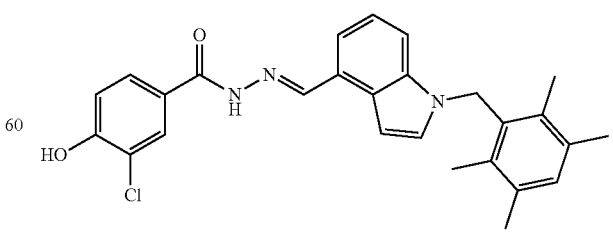

$^1$H NMR (500 MHz, DMSO-d$_6$): δ 11.66 (s, 1H), 10.92 (s, 1H), 8.68 (s, 1H), 7.99 (s, 1H), 7.81-7.73 (m, 2H), 7.35 (d,

J=6.98 Hz, 1H), 7.27 (t, J=7.42 Hz, 1H), 7.10-7.03 (m, 3H), 6.79 (s, 1H), 5.38 (s, 2H), 2.23 (s, 6H), 2.10 (s, 6H). HRMS (ESI) m/z: [M+H]$^+$ calcd for [C$_{27}$H$_{27}$ClN$_3$O$_2$]$^+$: 460.1792, observed: 460.1794.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all of the group members are present in, employed in, or otherwise relevant to a given product or process.

Furthermore, the disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the disclosure, or aspects described herein, is/are referred to as comprising particular elements and/or features, certain embodiments described herein or aspects described herein consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments described herein, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment described herein can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present disclosure, as defined in the following claims.

What is claimed is:
1. A compound of Formula (I):

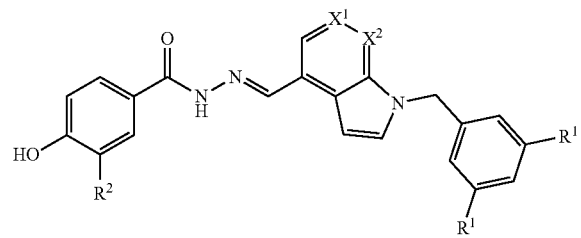

or a pharmaceutically acceptable salt thereof, wherein:
each $R^1$ is fluorine;
$R^2$ is halogen or —NO$_2$;
$X^1$ is C—H; and
$X^2$ is C—H or N.
2. The compound of claim 1, wherein $X^2$ is C—H.
3. The compound of claim 1, wherein $R^2$ is —NO$_2$.
4. A compound of Formula (III):

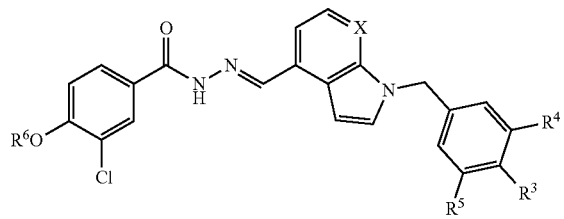

or a pharmaceutically acceptable salt, wherein:
$R^3$ is hydrogen, halogen, —CF$_3$, —CN, —NO$_2$, —C(=O)OR$^c$, wherein each $R^c$ is independently optionally substituted C$_{1-6}$ alkyl;
$R^4$ and $R^5$ are independently halogen, —CF$_3$, —CN, —NO$_2$, or —C(=O)OR$^b$, wherein $R^b$ is optionally substituted C$_{1-6}$ alkyl;
$R^6$ is optionally substituted aryl, optionally substituted C$_{1-6}$ alkyl, or optionally substituted C$_{1-8}$ heteroalkyl; and
X is C—H or N.

5. The compound of claim 4, of the formula:

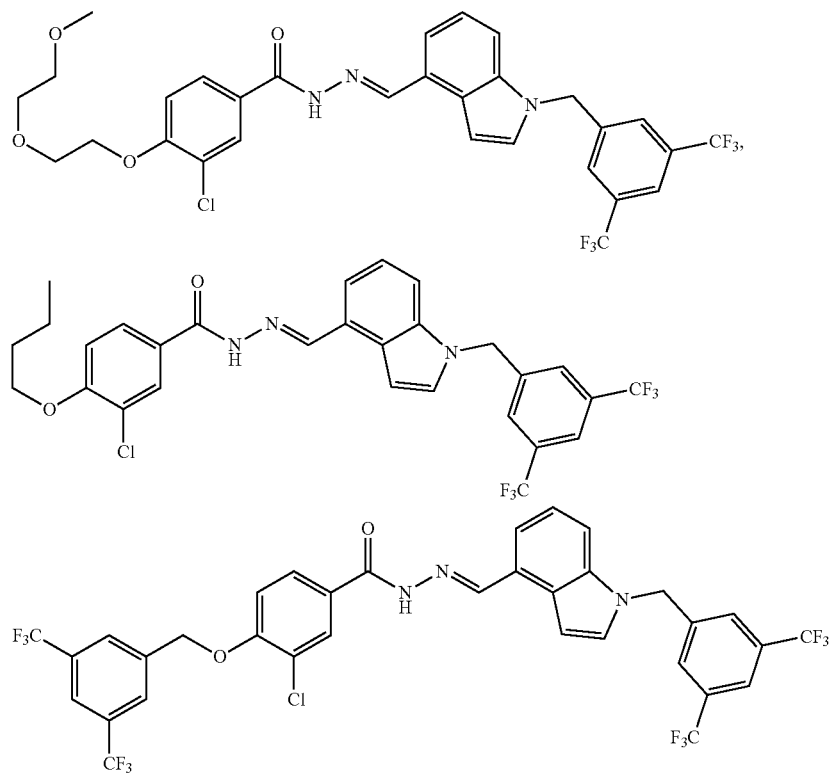

or a salt thereof.

6. A pharmaceutical composition comprising a compound of claim 1, or a pharmaceutically acceptable salt thereof, and optionally a pharmaceutically acceptable excipient.

7. A method of treating a subject suffering from an anxiety-related disorder, stress-related disease or disorder, addiction, or panic disorder, the method comprising administering to the subject a therapeutically effective amount of a compound of claim 1.

8. A method of treating a subject identified as in need of treatment for an anxiety-related disorder, stress-related disorder, panic disorder, or addiction, the method comprising administering to the subject a therapeutically effective amount of a compound of claim 1 or
a salt, or composition thereof.

9. The method of claim 7, further comprising administering an additional pharmaceutical agent to the subject.

10. The method of claim 9, wherein the additional pharmaceutical agent is a compound of claim 1, or a compound of the formula:

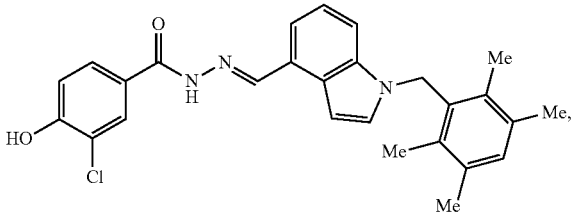

-continued

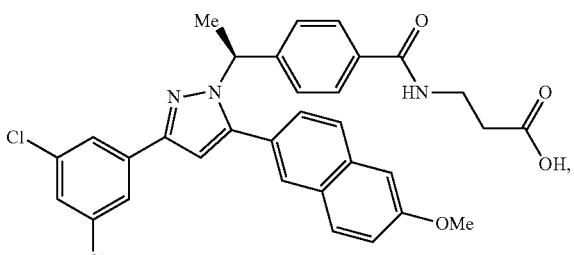

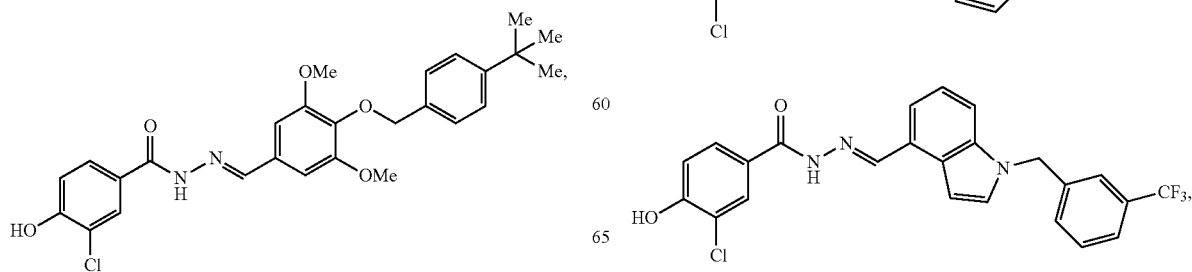

-continued

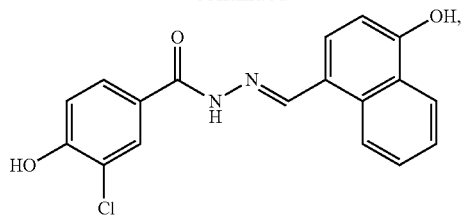

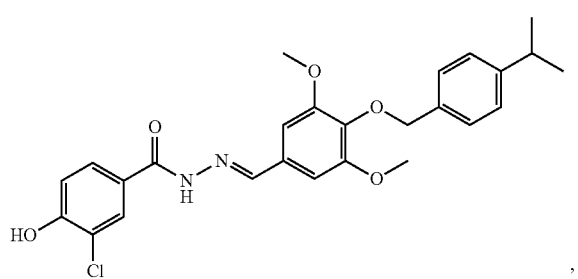

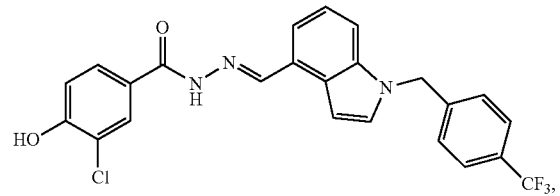

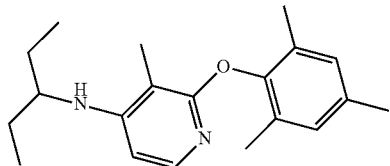

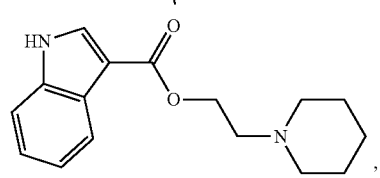

or a salt, or composition thereof.

11. The method of claim 9, wherein the additional pharmaceutical agent is the compound I-20, of the formula:

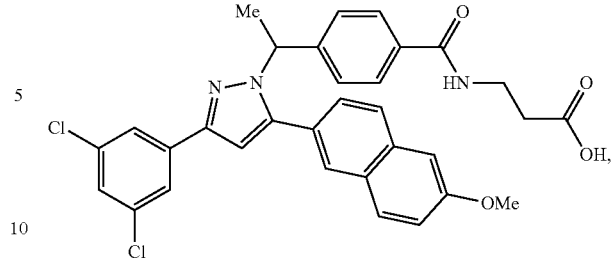

or a salt thereof.

12. A kit comprising:
a compound of claim 1 or a pharmaceutically acceptable salt, or composition thereof; and
instructions for administering to a subject or contacting a biological sample with the compound, or composition.

13. A method of treating a subject suffering from an anxiety-related disorder, the method comprising administering to the subject a therapeutically effective amount of a compound of the formula:

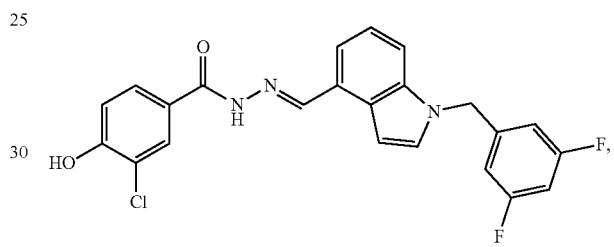

or a salt, or composition thereof.

14. A compound of Formulae

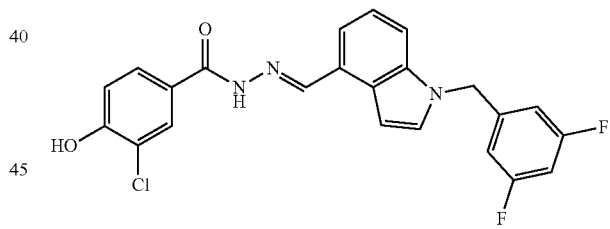

or a salt, or composition thereof.

* * * * *